(12) United States Patent
Hayashi et al.

(10) Patent No.: US 6,623,557 B2
(45) Date of Patent: Sep. 23, 2003

(54) COLORANT FOR INK-JET PRINTING INK, INK-JET PRINTING INK, AQUEOUS PIGMENT DISPERSION CONTAINING THE COLORANT, AND ORGANIC AND INORGANIC COMPOSITE PARTICLES

(75) Inventors: Kazuyuki Hayashi, Hiroshima (JP); Hiroko Morii, Hiroshima (JP); Keisuke Iwasaki, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/160,297

(22) Filed: Jun. 4, 2002

(65) Prior Publication Data

US 2003/0056693 A1 Mar. 27, 2003

(30) Foreign Application Priority Data

Jun. 5, 2001 (JP) ........................................ 2001-170199
Mar. 5, 2002 (JP) ........................................ 2002-059439

(51) Int. Cl.[7] .................................................. C08K 5/00
(52) U.S. Cl. ...................... 106/499; 106/31.6; 106/465; 106/471; 106/487; 106/447; 106/491; 428/403
(58) Field of Search .......................... 428/403; 106/447, 106/465, 471, 487, 491, 31.6

Primary Examiner—C. Melissa Koslow
Assistant Examiner—Shalie Manlove
(74) Attorney, Agent, or Firm—Nixon & Vanderhye P.C.

(57) ABSTRACT

A colorant for ink-jet printing ink of the present invention, has an average particle diameter of 0.001 to 0.15 μm, and comprises: extender pigments as core particles; a gluing agent coating layer formed on at least a part of surface of said core particle; and an organic pigment coat uniformly formed on at least a part of said gluing agent coating layer. The colorant for ink-jet printing ink exhibits not only a high tinting strength and a clear hue, but also excellent dispersibility and light resistance in spite of fine particles.

22 Claims, 5 Drawing Sheets

0.1μm 0.1μm 0.1μm 0.1μm 0.1μm 0.1μm 0.1μm 0.1μm 0.1μm 0.1μm 0.1μm

COLORANT FOR INK-JET PRINTING INK, INK-JET PRINTING INK, AQUEOUS PIGMENT DISPERSION CONTAINING THE COLORANT, AND ORGANIC AND INORGANIC COMPOSITE PARTICLES

BACKGROUND OF THE INVENTION

The present invention relates to a colorant for ink-jet printing ink, an ink-jet printing ink, an aqueous pigment dispersion and organic and inorganic composite particles, and more particularly, to a colorant for ink-jet printing ink exhibiting not only a high tinting strength and a clear hue, but also excellent dispersibility and light resistance in spite of fine particles; an ink-jet printing ink not only exhibiting excellent dispersion stability and light resistance, but also being free from clogging at a head portion of an ink-jet recording apparatus; an aqueous pigment dispersion containing the colorant; and organic and inorganic composite particles.

In recent years, the development of various OA devices such as personal computers has rapidly spread in both business and domestic applications. An ink jet printer as one of recording apparatuses for these OA devices has also been widely used owing to the recent tendency of a low price and a high performance thereof.

Upon practical use, it is important that the ink jet printers have a higher reliability and a broader applicability. To meet the requirements, ink-jet printing inks used in the ink jet printers have been required to be free from clogging at a head portion of the printers, and exhibit an excellent dispersion stability, a high print image density, excellent water resistance and light resistance, or the like.

Hitherto, various dyes have been used as colorants for ink-jet printing inks because of nonoccurrence of clogging at a head portion of the printers, a good dispersion stability, a good chroma and a good transparency. However, these dyes have problems due to toxicity. In order to solve the problems as well as satisfy the recent requirement for light resistance of printed matters, it has been attempted to use pigments instead of the dyes. As to this fact, Japanese Patent Application Laid-Open (KOKAI) No. 11-131001(1999) describes that " . . . Dyes have problems such as poor water resistance and light resistance of images printed therewith owing to inherent properties thereof. To solve the problems, it has been attempted to develop inks using pigments instead of the dyes".

When the pigments are used as a colorant for ink-jet printing inks, it is possible to form printed images having a high image density as well as excellent water resistance and light resistance as compared to in the case of using dyes as the colorant. However, since 80% of the ink-jet printing inks is generally constituted of water, it has been difficult to well disperse the pigments, especially organic pigments therein. In addition, since the pigments are usually insoluble in water, etc., unlike the dyes, it has been difficult to preserve ink-jet printing inks using such pigments at a stable condition for a long period of time, and there arises such a problem that a head portion of an ink-jet recording apparatus tends to be clogged therewith.

On the other hand, if the particle size of the colorant is reduced, it will be expected that the ink using such a colorant can be prevented from clogging at the head portion, and can be improved in transparency. However, the colorant having a small particle size tends to cause problems such as poor dispersibility in ink composition, low light resistance of ink using such a colorant, or the like.

Conventionally, there are known ink-jet printing inks using pigments (Japanese Patent Application Laid-Open (KOKAI) Nos. 9-227812(1997), 11-131001(1999) and 2000-53901); colorants prepared by coupling pigments with resins particles using a coupling agent (Japanese Patent Nos. 2903631 and 3097208); and colorants prepared by bonding dyes onto the surface of silica particles through a coupling agent (Japanese Patent No. 3105511).

At present, it has been strongly required to provide a colorant for ink-jet printing ink, which is not only excellent in tinting strength, light resistance and dispersibility, but also can show a clear hue. However, conventional colorants have still failed to satisfy these requirements.

That is, in Japanese Patent Application Laid-Open (KOKAI) Nos. 9-227812(1997) and 2000-53901, there is described an aqueous ink-jet recording liquid containing pigments and colloidal silica for the purpose of obtaining high-quality printed images. However, the organic pigments exhibit a poor dispersibility in an ink-jet printing ink composition, so that the resultant ink-jet printing ink fails to exhibit a good dispersion stability and a sufficient light resistance of printed images thereof. In addition, since a large amount of the colloidal silica not contributing to coloring is contained in the ink composition, it is difficult to sufficiently increase the pigment concentration thereof, thereby failing to obtain high-density printed images.

In Japanese Patent Application Laid-Open (KOKAI) No. 11-131001(1999), there is described an ink-jet recording liquid containing pigments adhered with fine particles of silica or barium sulfate. However, since an adhesion force of the fine particles onto the surface of the pigments is very weak, the fine particles tend to be desorbed from the pigments when dispersed in the ink-jet printing ink composition, so that it has been difficult to obtain an ink-jet printing ink having excellent dispersion stability and anti-clogging property as well as excellent light resistance of printed images thereof.

In Japanese Patent Nos. 2903631 and 3097208, there is described an ink-jet printing ink, in which the particles prepared by reacting pigments and resin particles using a coupling agent are dispersed. Since the coupling reaction is conducted in a solution as shown in the below-mentioned Comparative Examples, a sufficient shear force cannot be applied to the organic pigments. Therefore, it is difficult to disperse the organic pigments in the form of fine particles, thereby failing to uniformly adhere the organic pigments onto the surface of the resin particles.

In Japanese Patent No. 3105511, there are described particles prepared by adhering dyes onto the surface of silica particles through a silane-based coupling agent. As shown in the below-mentioned Comparative Examples, since the dyes are adhered onto the surface of silica particles, the obtained colored silica particles fail to show a sufficient light resistance.

Further, in Japanese Patent Application Laid-Open (KOKAI) Nos. 11-323174(1999) and 2001-11339, there are described iron-based black composite particles comprising black iron oxide particles or black iron oxide hydroxide particles; a coating layer formed on the surface of the black iron oxide particles or black iron oxide hydroxide particles, which comprises organosilane compounds obtainable from alkoxysilanes, or polysiloxanes; and a carbon black coat formed on the surface of the coating layer. However, the technical spheres described in these prior arts are to fix carbon black onto the iron-based black particles, and are quite different from those techniques for obtaining a colorant having a high chroma. In addition, since the iron-based particles have a specific gravity as high as 5 to 5.5, it may be difficult to obtain an ink-jet printing ink having a sufficient dispersion stability when the iron-based particles are used as a colorant therefor.

As a result of the present inventors' earnest studies, it has been found that a colorant having an average particle diameter of 0.001 to 0.15 µm and comprising extender pigments as core particles, a gluing agent coating layer formed on at least a part of the surface of the core particle, and an organic pigment coat formed onto at least a part of the gluing agent coating layer, exhibits not only a high tinting strength and a clear hue, but also excellent dispersibility and light resistance in spite of fine particles, and is suitably used as a colorant for ink-jet printing ink. The present invention has been attained on the basis of the findings.

SUMMARY OF THE INVENTION

An object of the present invention is to provide a colorant for ink-jet printing ink, in which organic pigments are adhered onto the surface of extender pigments through a gluing agent in the form of a uniform adhesion coat while being kept in an extremely finely dispersed state, and which can exhibit not only a high tinting strength and a clear hue but also excellent dispersibility and light resistance in spite of fine particles.

Another object of the present invention is to provide an ink-jet printing ink exhibiting not only excellent dispersion stability and light resistance but also being free from clogging at a head portion of an ink-jet recording apparatus.

A further object of the present invention is to provide an aqueous pigment dispersion containing the colorant for ink-jet printing ink.

A still further object of the present invention is to provide organic and inorganic composite particles having an average particle diameter of from 0.001 to less than 0.01 µm, in which organic pigments are uniformly adhered onto the surface of white inorganic particles through a gluing agent to form an organic pigment coat.

To accomplish the aims, in a first aspect of the present invention, there is provided a colorant for ink-jet printing ink, having an average particle diameter of 0.001 to 0.15 µm, comprising:

extender pigments as core particles;

a gluing agent coating layer formed on at least a part of surface of said core particle; and an organic pigment coat uniformly formed on at least a part of said gluing agent coating layer.

In a second aspect of the present invention, there is provided a colorant for ink-jet printing ink, having an average particle diameter of 0.001 to 0.15 µm, a BET specific surface area value of 15 to 500 m²/g, a specific gravity of 1.3 to 3.5 and a hiding power of less than 1,000 cm²/g, comprising:

extender pigments as core particles;

a gluing agent coating layer formed on at least a part of surface of said core particle; and an organic pigment coat uniformly formed on at least a part of said gluing agent coating layer in the amount of 1 to 500 parts by weight based on 100 parts by weight of said extender pigments.

In a third aspect of the present invention, there is provided a colorant for ink-jet printing ink, having an average particle diameter of 0.001 to 0.15 µm, comprising:

extender pigments as core particles;

a gluing agent-coating layer formed on at least a part of surface of said core particle;

an organic pigment coat uniformly formed on at least a part of said gluing agent coating layer; and an outer coating layer formed on at least a part of said organic pigment coat, comprising at least one material selected from the group consisting of anionic surfactants, nonionic surfactants, cationic surfactants and polymeric dispersing agent.

In a fourth aspect of the present invention, there is provided a colorant for ink-jet printing ink, having an average particle diameter of 0.001 to 0.15 µm, comprising:

extender pigments as core particles;

a coating layer formed on at least a part of surface of said core particle, comprising at least one compound selected from the group consisting of hydroxides of aluminum, oxides of aluminum, hydroxides of silicon and oxides of silicon;

a gluing agent-coating layer formed on at least a part of surface of said coating layer;

an organic pigment coat uniformly formed on at least a part of said gluing agent coating layer.

In a fifth aspect of the present invention, there is provided a colorant for ink-jet printing ink, having an average particle diameter of 0.001 to 0.15 µm, comprising:

extender pigments as core particles;

a coating layer formed on at least a part of surface of said core particle, comprising at least one compound selected from the group consisting of hydroxides of aluminum, oxides of aluminum, hydroxides of silicon and oxides of silicon, a gluing agent coating layer formed on at least a part of surface of said coating;

an organic pigment coat uniformly formed on at least a part of said gluing agent coating layer; and an outer coating layer formed on at least a part of said organic pigment coat, comprising at least one material selected from the group consisting of anionic surfactants, nonionic surfactants, cationic surfactants and polymeric dispersing agent.

In a sixth aspect of the present invention, there is provided an ink-jet printing ink comprising an ink base solution and colorant for ink-jet printing ink, having an average particle diameter of 0.001 to 0.15 µm, comprising:

extender pigments as core particles;

a gluing agent coating layer formed on at least a part of surface of said core particle; and an organic pigment coat uniformly formed on at least a part of said gluing agent coating layer.

In a seventh aspect of the present invention, there is provided an ink-jet printing ink comprising the colorant as defined in any one of second to fifth aspects and an ink base solution the amount of said colorant being 1 to 20% by weight based on the weight of the ink base solution.

In an eighth aspect of the present invention, there is provided a aqueous pigment dispersion comprising a base solution for the aqueous pigment dispersion and 10 to 40% by weight of colorant for ink-jet printing ink, having an average particle diameter of 0.001 to 0.15 µm, comprising:

extender pigments as core particles;

a gluing agent coating layer formed on at least a part of surface of said core particle; and an organic pigment coat uniformly formed on at least a part of said gluing agent coating layer.

In a ninth aspect of the present invention, there is provided an ink-jet printing ink comprising a dispersant, water and a aqueous pigment dispersion comprising a base solution for the aqueous pigment dispersion and 10 to 40% by weight of colorant for ink-jet printing ink, having an average particle diameter of 0.001 to 0.15 µm, comprising:

extender pigments as core particles;

a gluing agent coating layer formed on at least a part of surface of said core particle; and an organic pigment coat uniformly formed on at least a part of said gluing agent coating layer.

In tenth aspect of the present invention, there are provided organic and inorganic composite particles, having an average particle diameter of from 0.001 to less than 0.01 µm, comprising:

white inorganic particles as core particles;

a gluing agent coating layer formed on at least a part of surface of said white inorganic particles; and an organic pigment coat uniformly formed on at least a part of said gluing agent coating layer in an amount of 1 to 500 parts by weight based on 100 parts by weight of the white inorganic particles.

In an eleventh aspect of the present invention, there are provided organic and inorganic composite particles, having an average particle diameter of from 0.001 to less than 0.01 µm, comprising:

extender pigments as core particles;

a coating layer formed on at least a part of surface of said core particle, comprising at least one compound selected from the group consisting of hydroxides of aluminum, oxides of aluminum, hydroxides of silicon and oxides of silicon;

a gluing agent-coating layer formed on at least a part of surface of said coating layer;

an organic pigment coat uniformly formed on at least a part of said gluing agent coating layer in an amount of 1 to 500 parts by weight based on 100 parts by weight of the white inorganic particles.

DETAILED DESCRIPTION OF THE INVENTION

Figure 1:
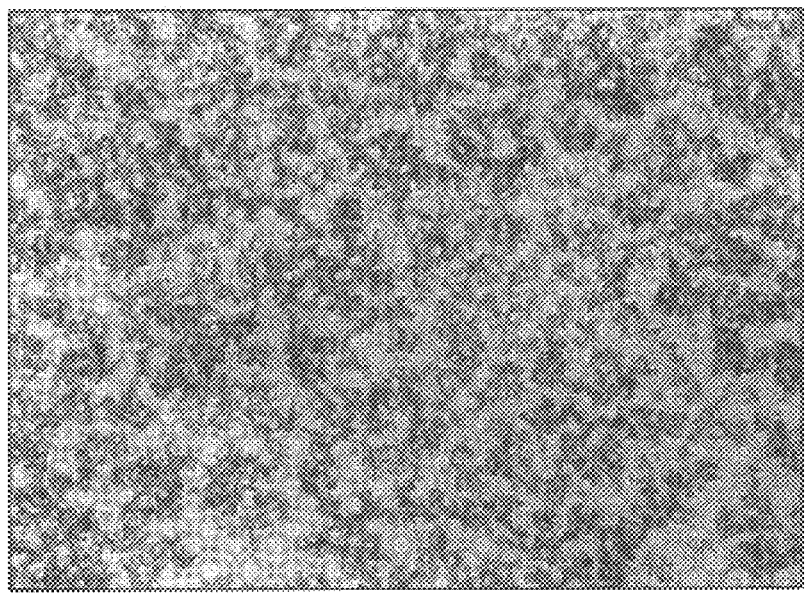
FIG. 1 is a micrograph (×50,000) of silica particles used in Example 1.

The present invention will now be described in detail below.

First, the colorant for ink-jet printing ink and the organic and inorganic composite particles according to the present invention are described.

The colorant for ink-jet printing ink according to the present invention has an average particle diameter of 0.001 to 0.15 µm, and comprises extender pigments as core particles, a gluing agent coating layer formed on at least a part of the surface of the respective core particles, and an organic pigment coat uniformly formed onto at least a part of the gluing agent coating layer.

The organic and inorganic composite particles according to the present invention have an average particle diameter of from 0.001 to less than 0.01 µm, and comprise white inorganic particles as core particles, a gluing agent coating layer formed on at least a part of the surface of the respective white inorganic particles, and an organic pigment coat formed onto at least a part of the gluing agent coating layer.

As the extender pigments used in the present invention, there may be exemplified silica particles such as silica powder, white carbon particles, fine silicic acid powder and diatomaceous earth particles, clay particles, calcium carbonate particles, precipitated barium sulfate particles, alumina white particles, talc, transparent titanium oxide particles, satin white particles or the like. Among these extender pigments, silica particles are preferred in the consideration of good hue of the obtained colorant for ink-jet printing ink.

As the white inorganic particles used in the present invention, in addition to the above extender pigments, there may be exemplified white pigments such as titanium dioxide particles and zinc oxide particles; pearl pigments such as titanium mica particles and muscovite particles; or the like. The white inorganic particles may be appropriately selected from the above-exemplified particles according to properties required therefor or applications thereof.

The core particles may be those having any suitable shape such as spherical particles, granular particles, polyhedral particles, acicular particles, spindle-shaped particles, rice ball-shaped particles, flake-shaped particles, scale-shaped particles and plate-shaped particles.

In particular, in the case of the colorant for ink-jet printing inks, the core particles thereof preferably have a spherical, granular or polyhedral shape. In the consideration of good dispersion stability of the obtained ink-jet printing ink, spherical particles or granular particles having a sphericity (average particle diameter (average maximum diameter)/average minimum diameter; hereinafter referred to merely as "sphericity") of from 1.0 to less than 2.0.

The core particles have an average particle diameter of preferably 0.0009 to 0.14 um, more preferably 0.002 to 0.11 µm, still more preferably 0.004 to 0.09 µm.

When the average particle diameter of the core particles is more than 0.14 µm, the obtained colorant may become coarse, resulting in deteriorated transparency and dispersibility. When the average particle diameter of the core particles is less than 0.0009 µm, such particles may tend to be agglomerated due to fine particles. As a result, it may be difficult to form a uniform gluing agent-coating layer on the surface of the core particles, and uniformly adhere the organic pigments onto the surface of the coating layer.

The core particles have a BET specific surface area value of preferably not less than 15 m²/g. When the BET specific surface area value is less than 15 m²/g, the core particles may become coarse, and the obtained colorant may also become coarse and, therefore, tend to be deteriorated in transparency and dispersibility. In the consideration of good transparency and dispersibility of the obtained colorant, the BET specific surface area value of the core particles is more preferably not less than 20 m²/g, still more preferably not less than 25 m²/g. In the consideration of forming a uniform gluing agent coating layer on the surface of the core particles or a uniform organic pigments coat onto the surface of the gluing agent coating layer, the upper limit of the BET specific surface area value of the core particles is preferably 500 m²/g, more preferably 450 m²/g, still more preferably 400 m²/g.

The core particles used in the present invention have a specific gravity of preferably 1.3 to 4.2, more preferably 1.4 to 3.8, still more preferably 1.5 to 3.4. When the specific gravity of the core particles is more than 4.2, the specific gravity of the obtained colorant may also become too high.

As to the hue of the core particles, the C* value thereof is preferably not more than 12.0, more preferably not more than 10.0, still more preferably not more than 8.00. When the C* value of the core particles is more than 12.0, it may be difficult to obtain the aimed colorant exhibiting a clear hue because of too strong hue of the core particles.

The core particles used in the present invention have a hiding power of preferably not more than 1,000 cm²/g, more preferably not more than 750 cm²/g, still more preferably not more than 500 cm²/g. In the case of the colorant for ink-jet printing ink, the core particles thereof have a hiding power of preferably not more than 400 cm²/g, more preferably not more than 300 cm²/g, still more preferably not more than 200 cm²/g, further still more preferably not more than 100 cm²/g. When the hiding power of the core particles of the colorant for ink-jet printing ink is more than 400 cm²/g, the obtained colorant tends to be deteriorated in transparency.

The gluing agent used in the present invention may be of any kind as long as the organic pigment can be adhered onto the surface of the core particle therethrough. Examples of the preferred gluing agents may include organosilicon compounds such as alkoxysilanes, fluoroalkylsilanes and polysiloxanes; various coupling agents such as silane-based coupling agents, titanate-based coupling agents, aluminate-based coupling agents and zirconate-based coupling agents; oligomer compounds; polymer compounds or the like. These gluing agents may be used alone or in the form of a mixture of any two or more thereof. In the consideration of adhesion strength of the organic pigment onto the surface of the core particle through the gluing agent, the more preferred gluing agents are the organosilicon compounds such as alkoxysilanes, fluoroalkylsilanes and polysiloxanes, and various coupling agents such as silane-based coupling agents, titanate-based coupling agents, aluminate-based coupling agents and zirconate-based coupling agents.

In particular, in the case where fine silica particles are used as the core particles, it is preferable to use the organosilicon compounds or the silane-based coupling agents as the gluing agent.

As organosilicon compounds used in the present invention, at least one organosilicon compound selected from the group consisting of (1) organosilane compounds obtained from alkoxysilane compounds; (2) polysiloxanes, or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group; and (3) fluoroalkyl organosilane compounds obtained from fluoroalkylsilane compounds.

The organosilane compounds (1) can be produced from alkoxysilane compounds represented by the formula (I):

$$R^1_a SiX_{4-a} \quad (I)$$

wherein $R^1$ is $C_6H_5-$, $(CH_3)_2CHCH_2-$ or n-$C_bH_{2b+1}-$ (wherein b is an integer of 1 to 18); X is $CH_3O-$ or $C_2H_5O-$; and a is an integer of 0 to 3.

Specific examples of the alkoxysilane compounds may include methyltriethoxysilane, dimethyldiethoxysilane, phenyltriethyoxysilane, diphenyldiethoxysilane, dimethyldimethoxysilane, methyltrimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of the organic pigments, methyltriethoxysilane, methyltrimethoxysilane, dimethyldimethoxysilane and isobutyltrimethoxysilane, phenyltriethyoxysilane are preferred, and methyltriethoxysilane and methyltrimethoxysilane are more preferred.

As the polysiloxanes (2), there may be used those compounds represented by the formula (II):

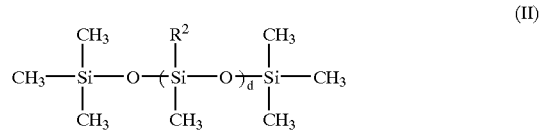

wherein $R^2$ is H— or $CH_3-$, and d is an integer of 15 to 450.

As the modified polysiloxanes (2-A), there may be used:

(a1) polysiloxanes modified with polyethers represented by the formula (III):

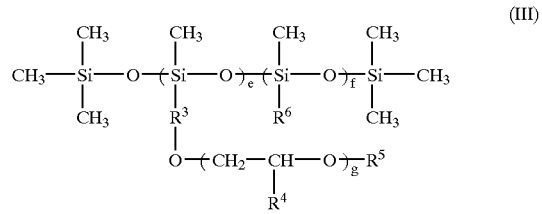

wherein $R^3$ is $-(-CH_2-)_h-$; $R^4$ is $-(-CH_2-)_i-CH_3$; $R^5$ is $-OH$, $-COOH$, $-CH=CH_2$, $-CH(CH_3)=CH_2$ or $-(-CH_2-)_j-CH_3$; $R^6$ is $-(-CH_2-)_k-CH_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

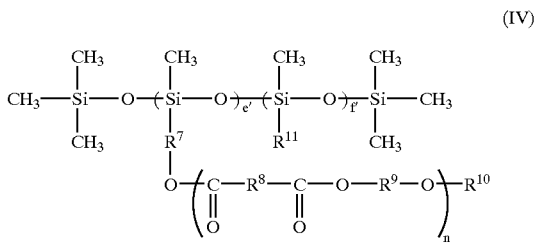

(IV)

wherein $R^7$, $R^8$ and $R^9$ are —($-CH_2-$)$_q$— and may be the same or different; $R^{10}$ is —OH, —COOH, —CH=CH$_2$, —CH(CH$_3$)=CH$_2$ or —($-CH_2-$)$_r$—CH$_3$; $R^{11}$ is —($-CH_2-$)$_s$—CH$_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

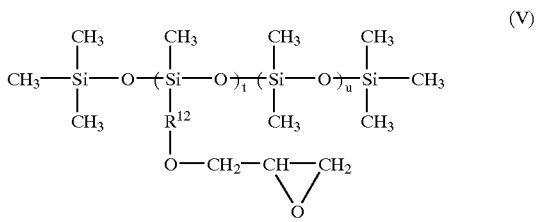

(V)

wherein $R^{12}$ is —($-CH_2-$)$_v$—; v is an integer of 1 to 15; t is an integer of 1 to 50; and u is an integer of 1 to 300; or a mixture thereof.

As the terminal-modified polysiloxanes (2-B), there may be used those represented by the formula (VI):

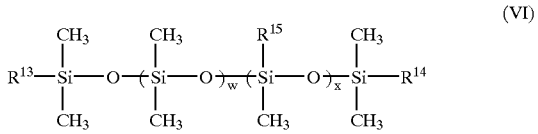

(VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —($-CH_2-$)$_y$—; wherein y is an integer of 1 to 15; w is an integer of 1 to 200; and x is an integer of 0 to 100.

In view of the desorption percentage and the adhering effect of the organic pigment, polysiloxanes having methyl hydrogen siloxane units, the polysiloxanes modified with the polyethers and the polysiloxanes whose terminals are modified with carboxylic acid groups are preferred.

The fluoroalkyl organosilane compounds (3) may be produced from fluoroalkylsilane compounds represented by the formula (VII):

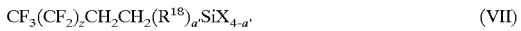

$$CF_3(CF_2)_z CH_2 CH_2 (R^{18})_{a'} SiX_{4-a'}$$ (VII)

wherein $R^{18}$ is CH$_3$—, C$_2$H$_5$—, CH$_3$O— or C$_2$H$_5$O—; X is CH$_3$O— or C$_2$H$_5$O—; and z is an integer of 0 to 15; and a' is an integer of 0 to 3.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl ethoxysilane, tridecafluorooctyl triethoxysilane, heptadecafluorodecyl triethoxysilane, or the like. Among these fluoroalkylsilane compounds, in view of the desorption percentage and the adhering effect of the organic pigment, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

As the silane-based coupling agents, there may be exemplified vinyltrimethoxysilane, vinyltriethoxysilane, γ-aminopropyltriethoxysilane, γ-glycidoxypropyltrimethoxysilane, γ-mercaptopropyltrimethoxysilane, γ-methacryloxypropyltrimethoxysilane, N-β(aminoethyl)-γ-aminopropyltrimethoxysilane, γ-glycidoxypropylmethyldimethoxysilane, γ-chloropropyl-trimethoxysilane or the like.

As the titanate-based coupling agents, there may be exemplified isopropyltristearoyl titanate, isopropyltris (dioctylpyrophosphate)titanate, isopropyltri(N-aminoethyl-aminoethyl)titanate, tetraoctylbis(ditridecylphosphate) titanate, tetra(2,2-diaryloxymethyl-l-butyl)bis(ditridecyl) phosphate titanate, bis(dioctylpyrophosphate)oxyacetate titanate, bis(dioctylpyrophosphate)ethylene titanate or the like.

As the aluminate-based coupling agents, there may be exemplified acetoalkoxyaluminum diisopropilate, aluminumdiisopropoxymonoethylacetoacetate, aluminumtrisethylacetoacetate, aluminumtrisacetylacetonate or the like.

As the zirconate-based coupling agents, there may be exemplified zirconiumtetrakisacetylacetonate, zirconiumdibutoxybisacetylacetonate, zirconiumtetrakisethylacetoacetate, zirconiumtributoxymonoethylacetoacetate, zirconiumtributoxyacetylacetonate or the like.

It is preferred to use oligomer compounds having a molecular weight of from 300 to less than 10,000. It is preferred to use polymer compounds having a molecular weight of about 10,000 to about 100,000. In the consideration of forming a uniform coating layer on the core particles, the oligomers or polymer compounds are preferably in a liquid state, or soluble in water or various solvents.

The amount of the gluing agent coating layer is preferably 0.01 to 15.0% by weight, more preferably 0.02 to 12.5% by weight, still more preferably 0.03 to 10.0% by weight (calculated as C) based on the weight of the gluing agent-coated core particles.

When the amount of the gluing agent-coating layer is less than 0.01% by weight, it may be difficult to adhere not less than one part by weight of the organic pigment onto 100 parts by weight of the core particles. When the amount of the gluing agent-coating layer is more than 15.0% by weight, since it is possible to adhere 1 to 500 parts by weight of the organic pigment onto 100 parts by weight of the core particles therethrough, it is unnecessary to form the gluing agent-coating layer in an amount of more than 15.0% by weight.

As the organic pigments used in the present invention, there may be exemplified various organic pigments ordinarily used as colorants for paints and resin compositions such as organic red-based pigments, organic blue-based pigments, organic yellow-based pigments, organic green-based pigments, organic orange-based pigments, organic brown-based pigments and organic violet-based pigments.

Examples of the organic red-based pigments may include quinacridon pigments such as quinacridon red, azo-based pigments such as permanent carmine and permanent red, condensed azo pigments such as condensed azo red, perylene pigments such as perylene red, or the like. Examples of the organic blue-based pigments may include phthalocyanine-based pigments such as metal-free phthalocyanine blue, phthalocyanine blue and fast sky blue, alkali blue, or the like. Examples of the organic yellow-based pigments may include monoazo-based pigments such as Hanza yellow, disazo-based pigments such as benzidine yellow and permanent yellow, condensed azo pigments such as condensed azo yellow, or the like. Examples of the organic green-based pigments may include phthalocyanine-based pigments such as phthalocyanine green, or the like. Examples of the organic orange-based pigments may include azo-based pigments such as permanent orange, lithol fast orange and vulcan fast orange, or the like. Examples of the organic brown-based pigments may include azo-based pigments such as permanent brown and para brown, or the like. Examples of the organic violet-based pigments may include azo-based pigments such as fast violet, or the like.

Meanwhile, these organic pigments may be used in the form of a mixture of any two or more thereof depending upon the hue required, or the two or more organic pigments of the same color type may be used in combination depending upon the hue and properties required.

The amount of the organic pigments adhered is preferably 1 to 500 parts by weight, more preferably 30 to 400 parts by weight, still more preferably 50 to 300 parts by weight based on 100 parts by weight of the core particles.

When the amount of the organic pigments adhered is less than one part by weight, the amount of the organic pigments coated on the core particles is too small, so that it may be difficult to obtain the aimed colorant having a clear hue according to the present invention. When the amount of the organic pigments adhered is more than 500 parts by weight, the organic pigments tend to be desorbed from the core particles because of too large amount of the organic pigments adhered. As a result, the colorant may be deteriorated in dispersibility in ink-jet printing inks or vehicles.

The particle shape and particle size of the colorant for ink-jet printing ink and the organic and inorganic composite particles according to the present invention may largely depend upon those of the core particles. The colorant and the organic and inorganic composite particles may have a particle configuration similar to that of the core particles, i.e., a slightly larger particle size than that of the core particles.

Specifically, the colorant for ink-jet printing ink according to the present invention has an average particle diameter of usually 0.001 to 0.15 $\mu$m, preferably 0.003 to 0.12 $\mu$m, more preferably 0.005 to 0.10 $\mu$m.

The organic and inorganic composite particles according to the present invention have an average particle diameter of preferably from 0.001 to less than 0.01 $\mu$m.

When the average particle diameter of the colorant for ink-jet printing ink according to the present invention is more than 0.15 $\mu$m, it may be difficult to prevent the obtained ink-jet printing ink from clogging a head portion of an ink-jet recording apparatus because of too large particle size thereof. When the average particle diameter of the colorant is less than 0.001 $\mu$m, the colorant tends to be agglomerated together due to fine particles, so that it may become difficult to disperse the colorant in the ink-jet printing ink.

The colorant for ink-jet printing ink and the organic and inorganic composite particles according to the present invention have a BET specific surface area value of preferably 15 to 500 m$^2$/g, more preferably 20 to 450 m$^2$/g, still more preferably 25 to 400 m$^2$/g. When the BET specific surface area value is less than 15 m$^2$/g, the obtained colorant for ink-jet printing ink, and organic and inorganic composite particles may become coarse. Further the colorant for ink-jet printing ink tends to be deteriorated in transparency. When the BET specific surface area value is more than 500 m$^2$/g, the obtained colorant for ink-jet printing ink and organic and inorganic composite particles may tend to be agglomerated together due to fine particles, resulting in deteriorated dispersibility in ink-jet printing inks or vehicles.

As to the hue of the colorant for ink-jet printing ink according to the present invention, the C* value thereof is preferably not less than 20, more preferably not less than 21, still more preferably not less than 22. In particular, in the case where the organic red-based pigments or the organic yellow-based pigments are used as the organic pigments, the C* value thereof is preferably not less than 40, more preferably not less than 45, still more preferably not less than 50. When the C* value is less than 20, the obtained colorant for ink-jet printing ink may fail to show a clear hue.

The colorant for ink-jet printing ink according to the present invention has a specific gravity of preferably 1.3 to 3.5, more preferably 1.4 to 3.0, still more preferably 1.5 to 2.5, further still more preferably 1.6 to 2.2. When the specific gravity of the colorant for ink-jet printing ink is more than 3.5, the resultant ink-jet printing ink tends to be deteriorated in dispersion stability.

The colorant for ink-jet printing ink according to the present invention has a hiding power of preferably less than 1,000 cm$^2$/g, more preferably not more than 900 cm$^2$/g, still more preferably not more than 800 cm$^2$/g. When the hiding power of is not less than 1,000 cm$^2$/g, the colorant for ink-jet printing ink tends to be deteriorated in transparency.

The tinting strength of the colorant for ink-jet printing ink and the organic and inorganic composite particles according to the present invention is preferably not less than 110%, more preferably not less than 115%, still more preferably not less than 120% when measured by the below-mentioned evaluation method.

The degree of desorption of the organic pigments from the colorant for ink-jet printing ink and the organic and inorganic composite particles according to the present invention is preferably the rank 5 or 4, more preferably the rank 5 when visually observed and evaluated by the below-mentioned method. When the degree of desorption of the organic pigments is the rank 1, 2 or 3, uniform dispersion of the colorant for ink-jet printing ink and the organic and inorganic composite particles in ink-jet printing inks or vehicles tends to be inhibited by the desorbed organic pigments.

As to the light resistance of the colorant for ink-jet printing ink and the organic and inorganic composite particles according to the present invention, the $\Delta E^*$ value thereof is preferably not more than 3.0, more preferably not more than 2.5, still more preferably not more than 2.0 when measured by the below-mentioned evaluation method. When the $\Delta E^*$ value is more than 3.0, images printed with an ink-jet printing ink using such a colorant as well as paints and resin compositions using the colorant may fail to show a sufficient light resistance.

At least a part of the surface of the colorant for ink-jet printing ink according to the present invention may be further coated, if required, with a surfactant and/or a polymeric dispersing agent. The colorant coated with the surfactant and/or polymeric dispersing agent can be improved in dispersibility in ink-jet printing inks as well as dispersion stability as compared to the uncoated colorant.

Examples of the surfactant may include anionic surfactants, nonionic surfactants and cationic surfactants. In the consideration of the effect of improving dispersibility in ink-jet printing inks as well as dispersion stability, among these surfactants, the anionic surfactants and nonionic surfactants are preferred.

Specific examples of the preferred anionic surfactants may include fatty acid salts, sulfuric acid esters, sulfonic acid salts, phosphoric acid esters or the like. Among these anionic surfactants, sulfuric acid esters and sulfonic acid salts are more preferred.

Specific examples of the preferred nonionic surfactants may include polyethylene glycol-type nonionic surfactants such as polyoxyethylene alkyl ethers and polyoxyethylene aryl ethers; polyhydric alcohol-type nonionic surfactants such as sorbitan fatty acid esters; or the like. Among these nonionic surfactants, polyethylene glycol-type nonionic surfactants are more preferred.

Specific examples of the preferred cationic surfactants may include amine salt-type cationic surfactants, quaternary ammonium salt-type cationic surfactants or the like. Among these cationic surfactants, the quaternary ammonium-salt-type cationic surfactants are more preferred.

As the polymeric dispersing agent, there may be used alkali-soluble resins such as styrene-acrylic acid copolymers, styrene-maleic acid copolymers, polyacrylic acid derivatives or the like.

The coating amount of the surfactant and/or polymeric dispersing agent is preferably 0.1 to 10.0% by weight, more preferably 0.2 to 7.5% by weight, still more preferably 0.3 to 5.0% by weight (calculated as C) based on the weight of the colorant coated with the surfactant and/or polymeric dispersing agent.

When the coating amount of the surfactant and/or polymeric dispersing agent is less than 0.1% by weight, it may be difficult to improve the dispersibility in ink-jet printing inks as well as the dispersion stability. When the coating amount of the surfactant and/or polymeric dispersing agent is more than 10% by weight, the effect of improving the dispersibility in ink-jet printing inks as well as the dispersion stability is already saturated. Therefore, it is unnecessary and meaningless to coat the colorant with the surfactant and/or polymeric dispersing agent in such a large amount.

The colorant coated with the surfactant and/or polymeric dispersing agent according to the present invention is substantially the same in particle size, BET specific surface area value, specific gravity, hue, hiding power, tinting strength, light resistance and degree of desorption of organic pigments as those of the colorant uncoated with the surfactant and/or polymeric dispersing agent according to the present invention.

In the colorant for ink-jet printing ink, and the organic and inorganic composite particles according to the present invention, if required, the surface of the core particle may be previously coated with at least one compound selected from the group consisting of hydroxides of aluminum, oxides of aluminum, hydroxides of silicon and oxides of silicon. The colorant for ink-jet printing ink, the organic and inorganic composite particles using the core particles having such a coat composed of at least one compound selected from the group consisting of hydroxides of aluminum, oxides of aluminum, hydroxides of silicon and oxides of silicon (hereinafter referred to merely as "intermediate coat"), can be more effectively reduced in amount of organic pigments desorbed from the surface of the core particles as compared to those using the core particles having no intermediate coat.

The amount of the intermediate coat is preferably 0.01 to 20% by weight (calculated as Al, $SiO_2$ or a sum of Al and $SiO_2$) based on the weight of the core particles coated with the intermediate coat.

When the amount of the intermediate coat is less than 0.01% by weight, it may be difficult to attain the effect of reducing the amount of organic pigments desorbed. As long as the amount of the intermediate coat is in the range of 0.01 to 20% by weight, the effect of reducing the amount of organic pigments desorbed can be sufficiently attained. Therefore, it is unnecessary to form the intermediate coat in an amount of more than 20% by weight.

The colorant for ink-jet printing ink produced by using the core particles having the intermediate coat according to the present invention are substantially the same in particle size, BET specific surface area value, specific gravity, hue, hiding power, tinting strength and light resistance as those of the colorant using the core particles having no intermediate coat according to the present invention. The degree of desorption of the organic pigments from the colorant can be improved by forming the intermediate coat on the core particles such that the colorant can show an organic pigment desorption degree of preferably the rank 5.

The organic and inorganic composite particles produced by using the core particles having the intermediate coat according to the present invention are substantially the same in particle size, BET specific surface area value, hue, tinting strength and light resistance as those of the organic and inorganic composite particles using the core particles having no intermediate coat according to the present invention. The degree of desorption of the organic pigments from the organic and inorganic composite particles can be improved by forming the intermediate coat on the core particles such that the organic and inorganic composite particles can show an organic pigment desorption degree of preferably the rank 5.

Next, the ink-jet printing ink containing the colorant of the present invention is described.

The ink-jet printing ink of the present invention comprises the colorant for ink-jet printing ink according to the present invention, a dispersant and water, and may further contain, if required, a water-soluble resin, a penetrant, a humectant, a water-soluble solvent, a pH modifier, a preservative or the like.

The amount of the colorant contained in the ink-jet printing ink is usually 1 to 20% by weight based on the weight of the ink base solution.

The amount of the dispersant contained in the ink-jet printing ink is preferably 5 to 200% by weight, more preferably 7.5 to 150% by weight, still more preferably 10 to 100% by weight based on the weight of the colorant for the ink-jet printing ink.

As the dispersant, there may be used the same surfactants and/or polymeric dispersing agents as used for coating the surface of the colorant. In the consideration of good dispersibility of the colorant in the ink-jet printing ink and good dispersion stability of the obtained ink, as the surfactant, anionic surfactants and nonionic surfactants are preferred, and as the polymeric dispersing agent, water-soluble resins such as styrene-acrylic acid copolymers are preferred.

As the solvent for the ink-jet printing ink, water may be used, if required, in combination with a water-soluble organic solvent. The amount of the water-soluble organic solvent contained in the ink-jet printing ink is preferably 1 to 50% by weight, more preferably 1 to 40% by weight, still more preferably 1 to 30% by weight based on the weight of the ink base solution.

Examples of the water-soluble organic solvent may include monohydric alcohols such as methanol, ethanol, n-propanol and isopropanol; dihydric alcohols such as ethylene glycol, diethylene glycol, triethylene glycol, tetraethylene glycol, propylene glycol and dipropylene glycol; trihydric alcohols such as glycerol; polyalkylene glycols such as polyethylene glycol; lower alkyl esters of polyhydric alcohols such as diethylene glycol monobutyl ether, ethylene glycol monobutyl ether and ethylene glycol monoethyl ether; or the like. These water-soluble organic solvents may be used alone or in the from of a mixture of any two or more thereof. Among these water-soluble organic solvents, dihydric alcohols are preferred.

The colorant dispersed in the ink-jet printing ink according to the present invention has an average dispersed particle diameter ($D_{50}$) of preferably not more than 0.2 μm, more preferably not more than 0.15 μm, still more preferably not more than 0.1 μm. When the dispersed particle diameter ($D_{50}$) of the colorant contained in the ink is more than 0.2 μm, a head portion of the ink-jet recording apparatus tends to be clogged therewith, and the dispersibility of the colorant in the ink-jet printing ink tends to be deteriorated.

The dispersion stability of the ink-jet printing ink according to the present invention is preferably the rank 4 or 5, more preferably the rank 5 when visually observed and evaluated by the below-mentioned method. The percentage of change in dispersed particle diameter ($D_{50}$) is preferably not more than 10%, more preferably not more than 8%.

As to the hue of printed images formed by using the ink-jet printing ink of the present invention, the C* value thereof is preferably not less than 20, more preferably not less than 22, still more preferably not less than 24. In particular, when the ink-jet printing ink contains such a colorant using the organic red-based pigments or organic yellow-based pigments as the organic pigments, the C* value of printed images thereof is preferably not less than 40, more preferably not less than 45, still more preferably not less than 50. When the C* value is less than 20, the resultant printed images may fail to exhibit a clear hue.

As to the light resistance of the printed images obtained by using the ink-jet printing ink of the present invention, the ΔE* value thereof is preferably not more than 3.0, more preferably not more than 2.5, still more preferably not more than 2.0.

The ink-jet printing ink of the present invention has an anti-clogging property at a head portion of preferably the rank 4 or 5, more preferably the rank 5 when visually observed and evaluated by the below-mentioned method.

Next, the aqueous pigment dispersion containing the colorant for the ink-jet printing ink according to the present invention which dispersion is used for the production of the ink-jet printing ink, is described.

The aqueous pigment dispersion of the present invention contains the colorant for ink-jet printing ink according to the present invention in an amount of usually 10 to 40% by weight, preferably 15 to 35% by weight.

The aqueous pigment dispersion of the present invention comprises the above colorant for ink-jet printing ink, a dispersant and water, and may further contain, if required, a water-soluble resin, a water-soluble solvent or the like.

As the dispersant for the aqueous pigment dispersion, there may be used the same dispersants as those used in the above ink-jet printing ink.

The dispersed particle diameter ($D_{50}$) of the colorant contained in the aqueous pigment dispersion of the present invention is preferably not more than 0.15 μm, more preferably not more than 0.12 μm, still more preferably not more than 0.09 μm.

The dispersion stability of the aqueous pigment dispersion of the present invention is preferably the rank 4 or 5, more preferably the rank 5 when visually observed and evaluated by the below-mentioned method. The percentage of change in the dispersed particle diameter ($D_{50}$) is preferably not more than 12%, more preferably not more than 10%.

The ink-jet printing ink obtained by using the aqueous pigment dispersion of the present invention can exhibit a more excellent dispersion condition such that the dispersed particle diameter ($D_{50}$) of the colorant contained in the ink is preferably not more than 0.15 μm, more preferably not more than 0.12 μm, still more preferably not more than 0.09 μm.

Next, the process for producing the colorant for ink-jet printing ink and the organic and inorganic composite particles according to the present invention, is described.

The colorant for ink-jet printing ink and the organic and inorganic composite particles according to the present invention can be produced by mixing the core particles with the gluing agent to form a gluing agent coating layer on at least a part of the surface of the respective core particles; and then mixing the core particles coated with the gluing agent with the organic pigments to form an organic pigment coat on at least a part of the gluing agent coating layer.

The formation of the gluing agent coating layer on the surface of the core particles may be performed by mechanically mixing and stirring the core particles with the gluing agent, or by mechanically mixing and stirring the core particles and the gluing agent while spraying the gluing agent onto the core particles. A substantially whole amount of the gluing agent added can be used for coating the surface of the core particles.

Meanwhile, in the case where alkoxysilanes or fluoroalkylsilanes are used as the gluing agent, a part of the alkoxysilanes or fluoroalkylsilanes may be coated in the form of organosilane compounds produced from the alkoxysilanes or fluoroalkyl organosilane compounds produced form fluoroalkylsilanes through the coating step. Even in such a case, subsequent adhesion of the organic pigment on the gluing agent-coating layer is not adversely affected.

In order to uniformly coat the gluing agent over the surface of the core particles, it is preferred that the agglomerated core particles are previously deaggregated using a crusher.

The mixing and stirring of the core particles with the gluing agent, the mixing and stirring of the organic pigment with the gluing agent-coated core particles, the mixing and stirring of the gluing agent with the core particles coated with the organic pigment coat through the gluing agent, and the mixing and stirring of the organic pigment and the core particles having the colored adhesion layer and the gluing agent coating layer formed thereon, is preferably carried out using an apparatus capable of applying a shear force to the powder mixture, especially such an apparatus capable of simultaneously effecting shear action, spatula stroking and compression. Examples of such apparatuses may include wheel-type kneaders, ball-type kneaders, blade-type kneaders, roll-type kneaders or the like. Among these apparatuses, the wheel-type kneaders are preferred to effectively practice the present invention.

Specific examples of the wheel-type kneaders may include edge runners (similar in meaning to mix muller, Simpson mill and sand mill), multimill, Stotz mill, Wet pan mill, corner mill, ring muller or the like. Among these kneaders, preferred are edge runners, multimill, Stotz mill, Wet pan mill and ring muller, and more preferred are edge runners. Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions of the mixing and stirring treatment may be selected so as to uniformly coat the surface of the particle with the gluing agent. Specifically, the mixing and stirring conditions may be appropriately controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the gluing agent added is preferably 0.15 to 45 parts by weight based on 100 parts by weight of the core particles. When the gluing agent is added in an amount of 0.15 to 45 parts by weight, it is possible to adhere 1 to 500 parts by weight of the organic pigment onto 100 parts by weight of the core particles.

After the surface of the core particle is coated with the gluing agent, the organic pigment is added, and then mixed and stirred with the coated core to adhere the organic pigment onto the gluing agent coating layer. The obtained particles may be further subjected to drying or heating treatments, if required.

As the adding method, a continuous addition method and a divided addition method may be exemplified. In case of continuously adding the organic pigments, the organic pigment may be added slowly and little by little, especially for a period of 5 minutes to 24 hours, preferably 5 minutes to 20 hours. In case of dividedly adding the organic pigments, the adding step of the organic pigments of 5 to 25 parts by weight based on 100 parts by weight of the core particles, and mixing and stirring step under the following conditions can be repeated until the added amount of the organic pigments reaches a predetermined amount thereof.

The mixing and stirring conditions may be appropriately selected so as to form a uniform organic pigment coat on the gluing agent coating layer, and may be controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the organic pigments added is usually 1 to 500 parts by weight, preferably 30 to 400 parts by weight, more preferably 50 to 300 parts by weight based on 100 parts by weight of the core particles. When the amount of the organic pigments added is out of the above-specified range, it may be difficult to obtain the aimed colorant for ink-jet printing ink.

The heating temperature used in the drying and heating treatments is preferably 40 to 150° C., more preferably 60 to 120° C., and the heating time is preferably 10 minutes to 12 hours, more preferably 30 minutes to 3 hours.

Meanwhile, in the case where alkoxysilanes or fluoroalkylsilanes are used as the gluing agent, a coating layer composed of organosilane compounds obtainable from the alkoxysilanes or fluorine-containing organosilane compounds obtainable from the fluoroalkylsilanes is finally formed on the surface of the core particles when treated through these steps.

In the production of the colorant for ink-jet printing ink, and the organic and inorganic composite particles according to the present invention, the organic pigments added are finely divided and adhered in the form of a uniform and dense adhesion coat on the surface of the core particles through the gluing agent when treated through the above steps.

The colorant for ink-jet printing ink whose surface is coated with the surfactant and/or polymeric dispersing agent according to the present invention can be produced by coating the above-obtained colorant with the surfactant and/or polymeric dispersing agent.

The formation of the surfactant and/or polymeric dispersing agent coating layer on the surface of the colorant may be performed by mechanically mixing and stirring the colorant with the surfactant and/or polymeric dispersing agent.

The amount of the surfactant and/or polymeric dispersing agent added is preferably 0.05 to 50 parts by weight based on 100 parts by weight of the colorant. By adding the surfactant and/or polymeric dispersing agent in an amount of 0.05 to 50 parts by weight, it is possible to further improve a dispersibility of the colorant in ink-jet printing ink, and a dispersion stability of the obtained ink.

The core particles may be previously coated, if required, with at least one compound selected from the group consisting of hydroxides of aluminum, oxides of aluminum, hydroxides of silicon and oxides of silicon, prior to mixing and stirring with the gluing agent.

The formation of the intermediate coat is conducted as follows. That is, an aluminum compound, a silicon compound or both the aluminum and silicon compounds are added to a water suspension prepared by dispersing the core particles in water. The resultant mixture is mixed and stirred together and then, if required, the pH value thereof is adjusted adequately, thereby forming the intermediate coat, on the surface of the core particle. Thereafter, the thus-obtained core particles coated with at least one compound selected from the group consisting of hydroxides of aluminum, oxides of aluminum, hydroxides of silicon and oxides of silicon are filtered out, washed with water, dried and then pulverized, and may be further subjected to subsequent treatments such as deaeration and compaction, if required.

Examples of the aluminum compound may include aluminum salts such as aluminum acetate, aluminum sulfate, aluminum chloride and aluminum nitrate, alkali aluminates such as sodium aluminate, or the like.

Examples of the silicon compound may include water glass #3, sodium orthosilicate, sodium metasilicate or the like.

Next, the process for producing the ink-jet printing ink according to the present invention, is described.

The ink-jet printing ink according to the present invention can be produced by mixing and dispersing a necessary amount of the colorant for ink-jet printing ink according to the present invention, a dispersant and water, if required, together with various additives such as a penetrant, a humectant, a water-soluble solvent, a pH modifier and a preservative using a dispersing device to form a primary dispersion; further mixing and dispersing the obtained dispersion together with water, a water-soluble solvent and other additives; and then filtering the resultant dispersion using a membrane filter.

As the dispersing device, there may be used a ball mill, a sand mill, an attritor, a roll mill, a beads mill, a colloid mill, an ultrasonic homogenizer, a high-pressure homogenizer or the like.

Next, the process for producing the aqueous pigment dispersion according to the present invention is described.

The aqueous pigment dispersion according to the present invention can be produced by mixing and dispersing a necessary amount of the colorant, a dispersant and water, if required, together with various additives such as a water-soluble resin and a water-soluble solvent using a dispersing device; and then filtering the resultant dispersion using a membrane filter.

As the dispersing device, there may be used a disper, a ball mill, a sand mill, an attritor, a roll mill, a beads mill, a colloid mill, an ultrasonic homogenizer, a high-pressure homogenizer or the like.

When the aqueous pigment dispersion of the present invention is used for the production of the ink-jet printing ink, a necessary amount of the aqueous pigment dispersion, a dispersant and water are mixed and dispersed, if required, together with various additives such as a water-soluble resin, a penetrant, a humectant, a water-soluble solvent, a pH modifier and a preservative using a dispersing device, and the resultant dispersion is filtered using a membrane filter to produce the ink-jet printing ink.

The aqueous pigment dispersion of the present invention may be used in such an amount that the concentration of pigments contained in the obtained ink-jet printing ink is in the range of 1 to 20% by weight.

As the dispersing device, there may be used the same dispersing devices as described above.

The point of the present invention is that the colorant for ink-jet printing ink, and the organic and inorganic composite particles comprising the core particles, the gluing agent coating layer formed on at least a part of the surface of the core particle and the organic pigments adhered in the form of a uniform adhesion coat onto at least a part of the gluing agent coating layer, can exhibit not only a high tinting strength and a clear hue, but also excellent dispersibility and light resistance in spite of fine particles.

The reason why the colorant for ink-jet printing ink, and the organic and inorganic composite particles according to the present invention can exhibit a clear hue, is considered as follows. That is, since the core particles used have a low chroma and a low hiding power, the organic pigments can exhibit an inherent hue thereof without being hidden and interfered by the hue of the core particles.

The reason why the colorant for ink-jet printing ink, and the organic and inorganic composite particles according to the present invention can exhibit an excellent dispersibility, is considered as follows. That is, since the core particles used have a relatively high dispersibility and the organic pigments are strongly adhered onto the surface of the core particles through the gluing agent, the amount of the organic pigments desorbed from the colorant, and the organic and inorganic composite particles can be reduced, so that the colorant, and the organic and inorganic composite particles are well dispersed in the system without disturbance by the desorbed organic pigments.

Also, when the surface of the colorant for ink-jet printing ink is coated with the surfactant and/or polymeric dispersing agent, the ink-jet printing ink using such a coated colorant can exhibit a more excellent dispersion stability. The reason therefor is considered to be that by coating the surface of the colorant of the present invention with the surfactant and/or polymeric dispersing agent capable of acting as a hydrophilic surface modifier, the colorant can be uniformly and stably dispersed in the ink-jet printing ink almost constituted of water.

The ink-jet printing ink of the present invention can exhibit not only an excellent dispersion stability, but also is free from clogging at a head portion of an ink-jet recording apparatus. In addition, printed images formed by using the ink-jet printing ink can exhibit a clear hue and an excellent light resistance.

The reason why the ink-jet printing ink of the present invention can exhibit an excellent dispersion stability, is considered as follow. That is, in general, the organic pigments are present in the ink base solution in the form of dispersed particles having a dispersed particle diameter ($D_{50}$) of about 0.2 μm and, therefore, tend to be self-agglomerated and precipitated with the passage of time. On the contrary, in the case of the colorant for ink-jet printing ink according to the present invention, since the organic pigments are adhered in the form of a uniform adhesion coat onto the surface of the extender pigments ordinarily used as an anti-precipitating agent, the individual colorant particles can exist in the ink base solution in a well-dispersed condition.

The reason why the ink-jet printing ink of the present invention is free from clogging at a head portion of an ink-jet recording apparatus, is considered as follows. That is, in general, organic pigments are difficult to finely disperse in the ink base solution. In addition, since the organic pigments are ordinary present in the ink base solution in the form of dispersed particles having a dispersed particle diameter ($D_{50}$) of about 0.2 μm, the organic pigments tend to be self-agglomerated with the passage of time. As a result, the particle size of the agglomerated organic pigments becomes larger than a nozzle diameter of the head portion of the ink-jet recording apparatus, thereby causing clogging of the head portion. On the contrary, in the case of the colorant for ink-jet printing ink according to the present invention, since the organic pigments are adhered onto the surface of the extender pigments in the form of a uniform adhesion coat, the colorant for ink-jet printing ink according to the present invention can be present in the ink base solution in a well-dispersed condition without self-agglomeration thereof.

The reason why the printed images obtained using the ink-jet printing ink of the present invention can exhibit a clear hue, is considered as follows. That is, in the case of the colorant for ink-jet printing ink according to the present invention, the organic pigments which are usually present in the ink base solution in the form of dispersed particles having a dispersed particle diameter ($D_{50}$) of about 0.2 μm, are adhered onto the surface of the extender pigments in the form of a uniform adhesion coat, namely the individual organic pigments can be kept in such a state similar to particles extremely finely dispersed in the ink. In addition, the colorant itself can exhibit an excellent dispersibility in the ink.

The reason why the printed images obtained using the ink-jet printing ink of the present invention can exhibit an excellent light resistance, is considered as follows. The colorant of the present invention which are obtained by adhering the organic pigments having a remarkably excellent light resistance in the form of a uniform adhesion coat as compared to dyes onto the surface of the extender pigments, is used as a colorant for the ink-jet printing ink.

The colorant for ink-jet printing ink according to the present invention can exhibit not only a high tinting strength and a clear hue, but also excellent dispersibility and light resistance in spite of fine particles and, therefore, can be suitably used as a colorant for ink-jet printing ink.

The ink-jet printing ink of the present invention can exhibit an excellent dispersion stability, and can be prevented from clogging a head portion of an ink-jet recording apparatus. In addition, the printed images obtained using the ink-jet printing ink of the present invention can exhibit a clear hue and an excellent light resistance. Therefore, the ink-jet printing ink of the present invention can be suitably used as an ink for ink-jet recording.

The organic and inorganic composite particles of the present invention can exhibit not only a high tinting strength and a clear hue, but also excellent dispersibility and light resistance in spite of fine particles and, therefore, can be suitably used as a colorant for paints, inks and resin compositions.

EXAMPLES

The present invention is described in more detail by Examples and Comparative Examples, but the Examples are only illustrative and, therefore, not intended to limit the scope of the present invention.

Various properties were evaluated by the following methods.

(1) The average particle size of the particles was expressed by an average value of 350 particles observed on a micrograph (×50,000).

(2) The sphericity was expressed by a ratio of average particle diameter (average maximum diameter) to average minimum diameter.

(3) The specific surface area was expressed by the value measured by a BET method.

(4) The specific gravity of each of the core particles, organic pigments, colorant for ink-let printing ink, and organic and inorganic composite particles was measured using a "Multi-Volume Densitometer 1305-Model" (manufactured by Micro-Meritix Co., Ltd.).

(5) The amounts of Al and Si which were present on the surface of core particle coated with at least one compound selected from the group consisting of hydroxides of aluminum, oxides of aluminum, hydroxides of silicon and oxides of silicon, were respectively measured by a fluorescent X-ray spectroscopy device "3063 M-type" (manufactured by RIGAKU DENKI KOGYO CO., LTD.) according to JIS K0119 "General rule of fluorescent X-ray analysis".

(6) The amount of the gluing agent coating layer formed on the surface of the core Particles, the amount of the organic pigments adhered to the colorant for ink-let printing ink and the organic and inorganic composite particles, and the amount of the surfactant and/or polymeric dispersing agent coated on the surface of the colorant for ink-let printing ink, were respectively determined by measuring the carbon contents using "Horiba Metal, Carbon and Sulfur Analyzer EMIA-2200 Model" (manufactured by Horiba Seisakusho Co., Ltd.).

(7) The decree of desorption of the organic Pigments from the core particles was visually observed and evaluated by the following method, and the observation results were classified into the following five ranks. The rank 5 represents that the amount of the organic pigments desorbed from the surface of the core particles was smallest.

That is, 2 g of the particles to be measured and 20 ml of ethanol were placed in a 50-ml conical flask and then was subjected to ultrasonic dispersion for 60 minutes. Thereafter, the obtained dispersion was centrifuged at a rotating speed of 10,000 rpm for 15 minutes to separate the particles from the solvent. The obtained particles were dried at 80° C. for one hour, and the micrograph (×50,000) thereof was visually observed to count the number of the desorbed and re-aggregated organic pigment particles present in visual field of the micrograph. The micrograph was compared with a micrograph (×50,000) of mixed particles obtained by simply mixing the core particles with the organic pigments without forming the gluing agent coating layer. The results are classified into the following five ranks.

Rank 1: Number of desorbed and re-aggregated particles was substantially the same as that in the simply mixed particles;

Rank 2: 30 to 49 desorbed and re-aggregated particles per 100 core particles were recognized;

Rank 3: 10 to 29 desorbed and re-aggregated particles per 100 core particles were recognized;

Rank 4: 5 to 9 desorbed and re-aggregated particles per 100 core particles were recognized; and Rank 5: 0 to 4 desorbed and re-aggregated particles per 100 core particles were recognized.

(8) The hue of each of the core particles, organic pigments, colorant for ink-jet printing ink, and organic and inorganic composite particles, were measured by the following method.

That is, 0.5 g of each sample and 0.5 ml of castor oil were intimately kneaded together by a Hoover's muller to form a paste. 4.5 g of clear lacquer was added to the obtained paste and was intimately kneaded to form a paint. The obtained paint was applied on a cast-coated paper by using a 150 µm (6-mil) applicator to produce a coating film piece (having a film thickness of about 30 µm). The thus obtained coating film piece was measured by a Multi-Spectro-Colour-Meter "MSC-IS-2D" (manufactured by SUGA SHIKENKI CO., LTD.) to determine color specification values (L*, a* and b* values) thereof according to JIS Z 8729. Meanwhile, the C* value representing chroma is calculated according to the following formula:

$$C^* = ((a^*)^2 + (b^*)^2)^{1/2}$$

(9) The tinting strength of each of the colorant for ink-jet printing ink, and the organic and inorganic composite particles was measured by the following method.

That is, a primary color enamel and a vehicle enamel prepared by the below-mentioned method were respectively applied on a cast-coated paper by using a 150 µm (6-mil) applicator to produce coating film pieces. The thus obtained coating film pieces were measured by a Multi-Spectro-Colour-Meter "MSC-IS-2D" (manufactured by SUGA SHIKENKI CO., LTD.) to determine a color specification value (L* value) thereof according to JIS Z 8729. The difference between the obtained L* values was represented by a ΔL* value.

Next, as a standard sample for the colorant for ink-jet printing ink, and organic and inorganic composite particles, a mixed pigment was prepared by simply mixing the organic pigments and the core particles at the same mixing ratio as used for the production of the colorant for ink-jet printing ink and organic and inorganic composite particles. Using the thus prepared mixed pigment as standard sample, the same procedure as defined above was conducted to prepare an primary color enamel and a vehicle enamel, to form coating film pieces and to measure L* values thereof. The difference between the L* values was represented by a ΔLS* value.

From the obtained ΔL* value of the colorant for ink-jet printing ink, and organic and inorganic composite particles and ΔLs* value of the standard sample, the tinting strength (%) was calculated according to the following formula:

Tinting strength (%) = 100 + {(ΔLs* − ΔL*) × 10}

Preparation of Primary Color Enamel:

10 g of the above sample particles, 16 g of an amino alkyd resin and 6 g of a thinner were blended together. The resultant mixture was added together with 90 g of 3 mmφ glass beads into a 140-ml glass bottle, and then mixed and dispersed for 45 minutes by a paint shaker. The obtained mixture was mixed with 50 g of an amino alkyd resin, and further dispersed for 5 minutes by a paint shaker, thereby obtaining an primary color enamel.

Preparation of Vehicle Enamel:

12 g of the above-prepared primary color enamel and 40 g of Aramic White (titanium dioxide-dispersed amino alkyd resin) were blended together, and the resultant mixture was mixed and dispersed for 15 minutes by a paint shaker, thereby preparing a vehicle enamel.

(10) The hiding power of each of the core particles, organic pigments, colorant for ink-jet printing ink, and organic and inorganic composite particles was measured by the cryptometer method according to JIS K5101-8.2 using the above-prepared primary color enamel.

(11) The light resistance of each of the colorant for ink-jet printing ink, and organic and inorganic composite particles was measured by the following method.

That is, the primary color enamel as prepared above was applied onto a cold-rolled steel plate (0.8 mm×70 mm×150 mm; JIS G-3141) and dried to form a coating film having a thickness of 150 um. One half of the thus prepared test specimen was covered with a metal toil, and an ultraviolet light was continuously irradiated over the test specimen at an intensity of 100 mW/cm² for 6 hours using "EYE SUPER UV TESTER SUV-W13" (manufactured by IWASAKI DENKI CO., LTD.). Then, the hues (L*, a* and b* values) of the UV-irradiated portion and the metal foil-covered non-irradiated portion of the test specimen were respectively measured using a Multi-Spectro-Colour-Meter "MSC-IS-2D" (manufactured by SUGA SHIKENKI CO., LTD.). The ΔE* value was calculated from differences between the measured hue values of the metal foil-covered non-irradiated portion and the UV-irradiated portion according to the following formula:

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(12) The dispersed particle diameter ($D_{50}$) of particles contained in the ink-jet printing ink and aqueous pigment dispersion was measured by a laser diffraction-type particle size distribution measuring device "Model HELOSLA/KA" manufactured by SYMPATEC Co., Ltd.

(13) The dispersion stability of the ink-jet printing ink was evaluated as follows. That is, 25 ml of an ink-jet printing ink to be measured was placed in a tube color comparison and allowed to stand at 60° C. for one month. Then, the degree of precipitation of the colorant contained in the ink-jet printing ink was visually observed and evaluated. The observation results were classified into the following five ranks.

Rank 1: Length of uncolored portion was not less than 10 cm;

Rank 2: Length of uncolored portion was from 5 cm to less than 10 cm;

Rank 3: Length of uncolored portion was from 1 cm to less than 5 cm;

Rank 4: Length of uncolored portion was less than 1 cm;

Rank 5: Uncolored portion was not recognized.

(14) The percentage of chance in dispersed particle diameter ($D_{50}$) of particles contained in the ink-jet printing ink and aqueous pigment dispersion were determined as follows. That is, after an ink or aqueous pigment dispersion to be measured was allowed to stand at 60° C. for one month, the dispersed particle diameter ($D_{50}$) of particles contained therein was measured by a laser diffraction-type particle size distribution measuring device "Model HELOSLA/KA" manufactured by SYMPATEC Co., Ltd. The percentage of change in dispersed particle diameter was expressed by the value (%) obtained by dividing the amount of change in dispersed particle diameter between before and after the standing test by the dispersed particle diameter measured before the standing test.

(15) The hue and chroma of the ink-jet printing ink were expressed by the color specification values (L*, a* and b* values) and the C* value, respectively, which were determined according to JIS Z 8729 by measuring the hue of images printed on a plain paper "KB" (produced by KOKUYO CO., LTD.) using a Multi-Spectro-Colour-Meter "MSC-IS-2D" (manufactured by SUGA SHIKENKI CO., LTD.).

(16) The light resistance of the ink-jet printing ink was measured by the following method.

That is, images were printed on a plain paper "KB" (produced by KOKUYO CO., LTD.) using an ink-jet printing ink to be measured. One half of the thus printed paper was covered with a metal foil, and an ultraviolet light was continuously irradiated over the paper at an intensity of 100 mW/cm² for 6 hours using "EYE SUPER UV TESTER SUV-W13" (manufactured by IWASAKI DENKI CO., LTD.). Then, the hues (L*, a* and b* values) of the printed images on the UV-irradiated portion and the metal foil-covered non-irradiated portion of the paper were respectively measured using a Multi-Spectro-Colour-Meter "MSC-IS-2D" (manufactured by SUGA SHIKENKI CO., LTD.). The ΔE* value was calculated from differences between the measured hue values of the printed images formed on the metal foil-covered non-irradiated portion and UV-irradiated portion of the paper according to the above formula. The light resistance of the ink-jet printing ink was expressed by the ΔE* value.

(17) The anti-clogging property of the ink-jet printing ink was determined as follows. That is, an ink to be measured was filled in an ink cartridge of an ink jet printer "DESKJET 970Cxi" (manufactured by HEWLETT PACKARD CORP.) to repeatedly print ink images on plain papers "KB" (produced by KOKUYO CO., LTD.) at room temperature. The printed images were visually observed to examine the degrees of non-uniformity, lack and non-jetted defects thereof. The observation results were classified into the following five ranks.

Rank 1: Non-uniformity, lack or non-jetted defects of printed images were caused subsequent to the first printed paper;

Rank 2: Non-uniformity, lack or non-jetted defects of printed images were not caused until the 5th printed paper;

Rank 3: Non-uniformity, lack or non-jetted defects of printed images were not caused until the 10th printed paper;

Rank 4: Non-uniformity, lack or non-jetted defects of printed images were not caused until the 20th printed paper; and Rank 5: Non-uniformity, lack or non-jetted defects of printed images were not caused until the 25th printed paper.

Example 1
<Production of Colorant for Ink-Jet Printing Ink>

280 g of methyl hydrogen polysiloxane (tradename: "TSF484", produced by GE TOSHIBA SILICONE CO., LTD.) was added to 7.0 kg of silica particles as shown in the micrograph (×50,000) of FIG. 1 (core particles A; particle shape: spherical shape; average particle diameter: 0.022 um; sphericity: 1.06; BET specific surface area value: 193.8 m$^2$/g; specific gravity: 2.32; L* value: 92.4; a* value: 0.2; b* value: 0.4; C* value: 0.4; hiding power: 10 cm$^2$/g) while operating an edge runner, and the resultant mixture was mixed and stirred for 30 minutes under a linear load of 588 N/cm (60 Kg/cm) at a stirring speed of 22 rpm.

Figure 2:
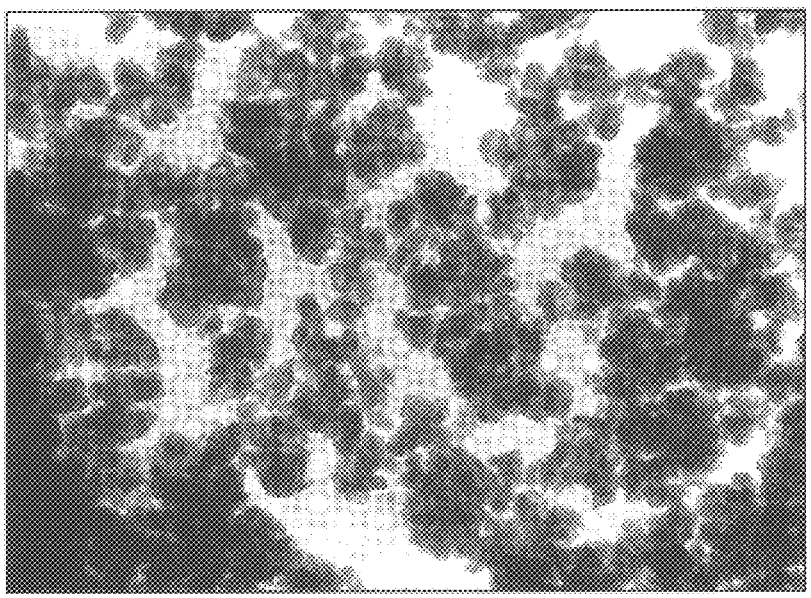
FIG. 2 is a micrograph (×50,000) of organic pigments A used in Example 1.

Then, 7.0 kg of organic pigments A as shown in the micrograph (×50,000) of FIG. 2 (kind: phthalocyanine-based pigments; particle shape: granular shape; average particle diameter: 0.06 um; BET specific surface area value: 71.6 m$^2$/g; specific gravity: 1.65; hiding power: 630 cm$^2$/g; light resistance (ΔE* value): 10.8; L* value: 17.7; a* value: 9.7; b* value: −23.4; C* value: 25.4) were added to the above-obtained mixture for 30 minutes while operating the edge runner, and the resultant mixture was mixed and stirred for 120 minutes under a linear load of 588 N/cm (60 Kg/cm) at a stirring speed of 22 rpm, thereby forming the organic pigments A coat onto the methyl hydrogen polysiloxane coating layer formed on the respective silica particles. The obtained particles were dried at 80° C. for 60 minutes using a dryer, thereby obtaining a colorant.

The thus obtained colorant was in the form of granular particles having an average particle diameter of 0.026 μm and a sphericity of 1.07, and had a BET specific surface area value of 128.1 m$^2$/g; and a specific gravity of 1.97. As to the hue of the colorant, the L* value thereof was 20.9; the a* value thereof was 9.4; the b* value thereof was −21.6; and the C* value thereof was 23.6. In addition, it was confirmed that the colorant had a hiding power of 550 cm$^2$/g; a tinting strength of 158%; a light resistance (ΔE* value) of 1.6; and an organic pigment desorption degree of Rank 5; and a coating amount of methyl hydrogen polysiloxane of 1.08% by weight (calculated as C), and that the amount of the organic pigments A adhered was 33.16% by weight (calculated as C; corresponding to 100 parts by weight based on 100 parts by weight of the silica particles).

Figure 3:
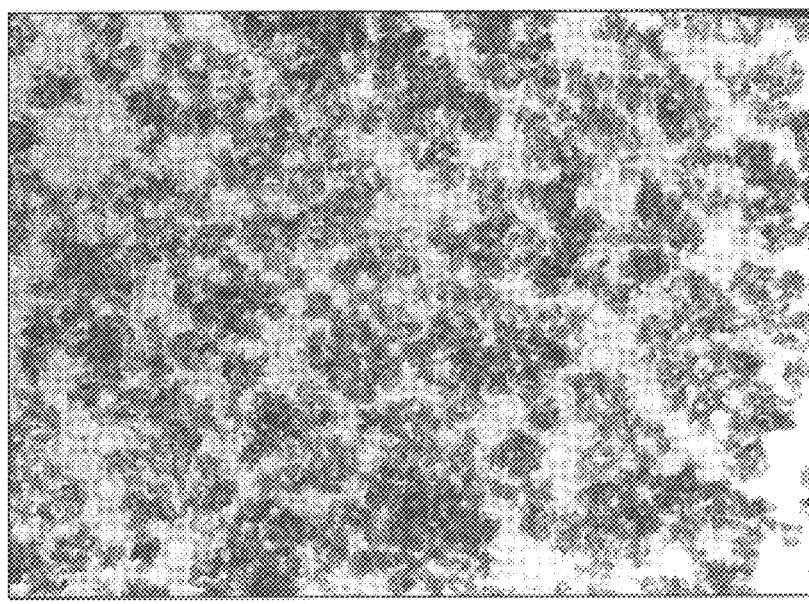
FIG. 3 is a micrograph (×50,000) of a colorant used in Example 1.

As a result of observing the micrograph (×50,000) of the obtained colorant as shown in FIG. 3, since almost no organic pigments A were recognized from the micrograph, it was confirmed that a substantially whole amount of the organic pigments A used contributed to the formation of the organic pigment coat on the coating layer composed of methyl hydrogen polysiloxane. Further, it was confirmed that the organic pigments A adhered no longer maintained the particle shape and size of those initially added, more specifically the organic pigments A had a much finer particle size than that of the core particles and were adhered on the extender pigments in the form of a uniform adhesion coat.

Figure 4:
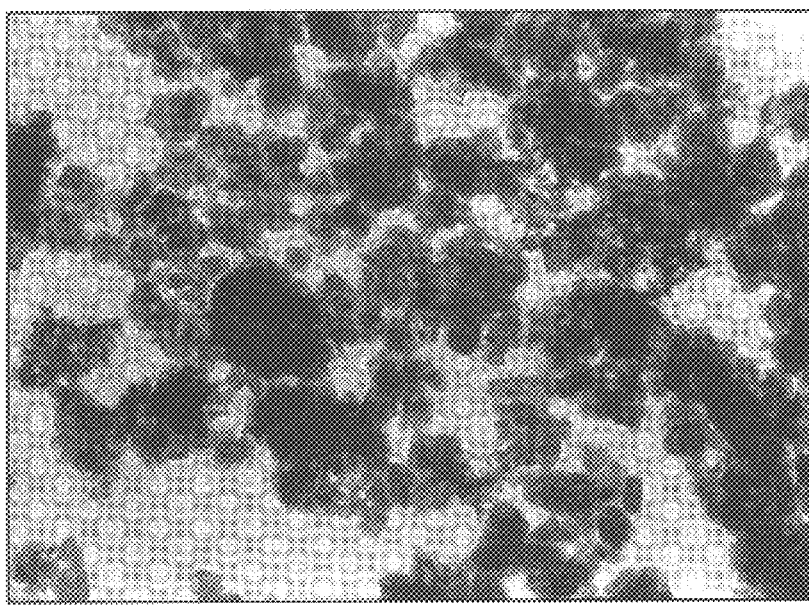
FIG. 4 is a micrograph (×50,000) of a simple mixture of silica particles and organic pigments A used for comparison in Example 1.
Figure 5:
FIG. 5 is a micrograph (×50,000) of organic pigments B used in Example 17.
Figure 6:
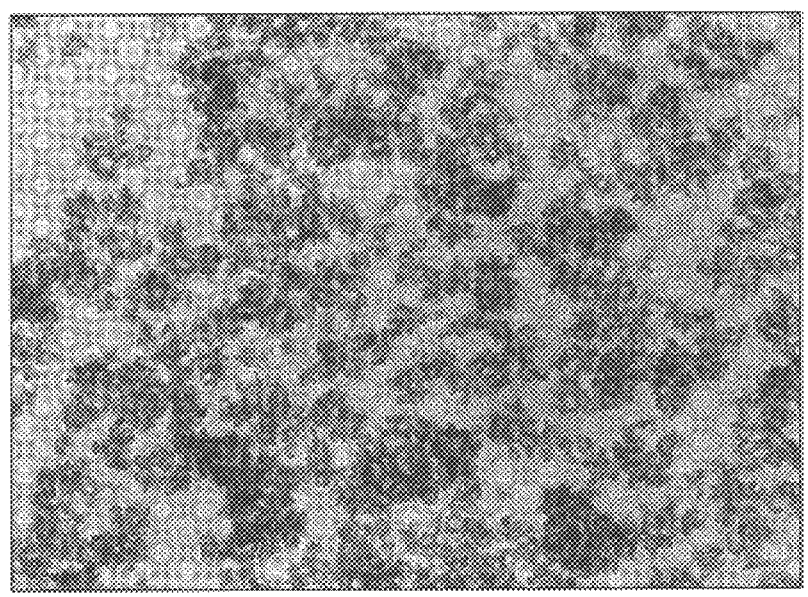
FIG. 6 is a micrograph (×50,000) of a colorant for ink-jet printing ink obtained in Example 17.
Figure 7:
FIG. 7 is a micrograph (×50,000) of a simple mixture of silica particles and organic pigments B used for comparison in Example 1.
Figure 8:
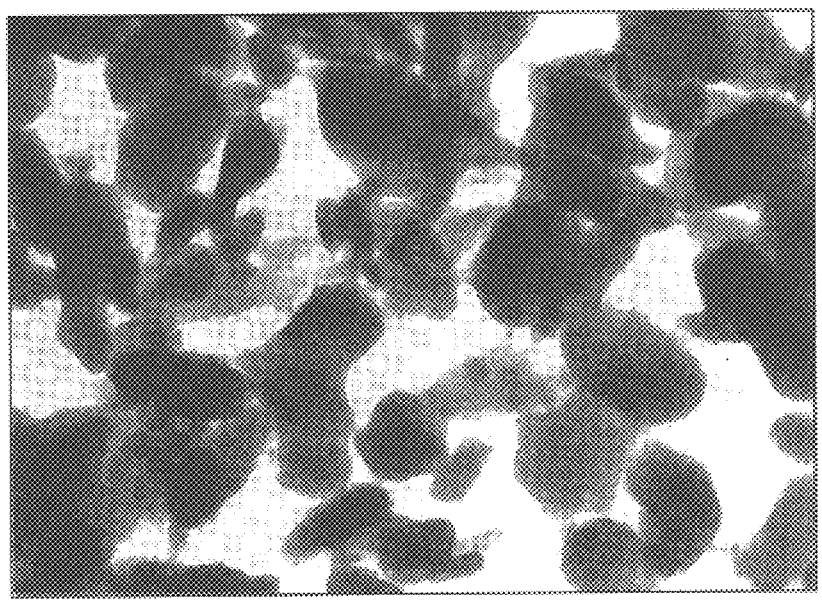
FIG. 8 is a micrograph (×50,000) of organic pigments D used in Example 18.
Figure 9:
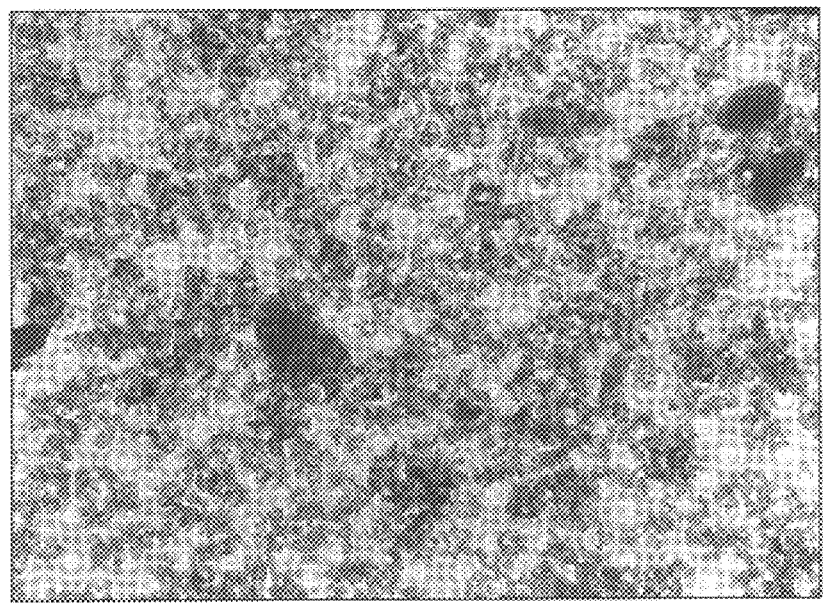
FIG. 9 is a micrograph (×50,000) of a colorant for ink-jet printing ink obtained in Example 18.
Figure 10:
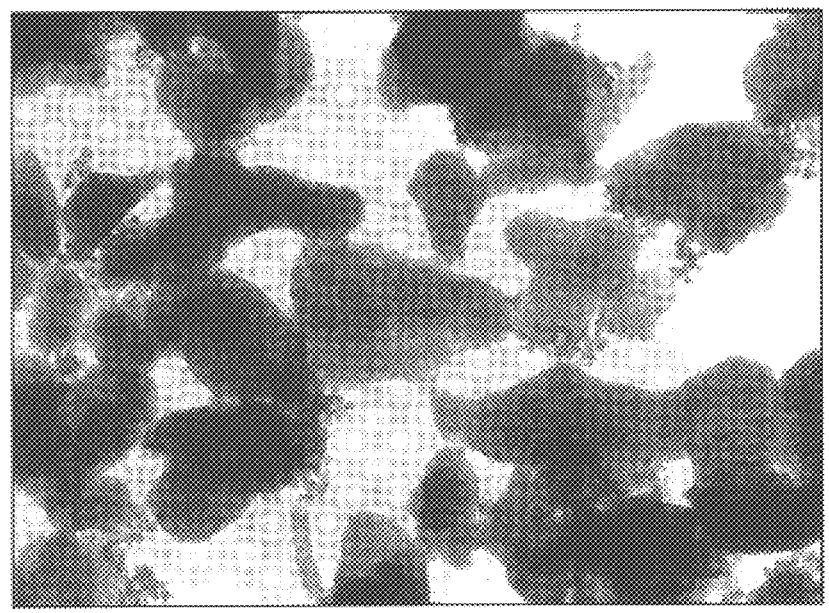
FIG. 10 is a micrograph (×50,000) of a simple mixture of silica particles and organic pigments D used for comparison in Example 1.

On the other hand, the extender pigments and the organic pigments A were simply mixed with each other by the same method as defined above except that no gluing agent was used. The micrograph (×50,000) of the thus obtained simply mixed particles is shown in FIG. 4. As is apparent from the micrograph of FIG. 4, in the case where the organic pigments A and the silica particles were simply mixed with each other without using the gluing agent, it was confirmed that the organic pigments A were not reduced in particle size, and both the particles were dispersed separately and independently from each other, thereby failing to form a uniform and dense coat adhered onto the surface of the extender pigments.

Example 2
<Production of Ink-Jet Printing Ink A>

88.5 parts by weight of ion-exchanged water and 1.2 parts by weight of a dispersant (mixture of polyacrylic acid and styrene-maleic acid copolymer (mixing ratio: 8:2)) were charged into a sand mill and mixed with each other. Then, 10.0 parts by weight of the colorant obtained in Example 1 and 0.3 part by weight of a defoaming agent (silicone-based defoamer) were added to the mixed solution, and the resultant mixture was mixed and dispersed for one hour, thereby obtaining a primary dispersion for an ink-jet printing ink.

Next, the following components were mixed and stirred at the mixing ratio shown below, and the resultant mixture was passed through a 0.5 μm-mesh membrane filter, thereby obtaining an ink-jet printing ink.

| Ink composition | |
| --- | --- |
| Primary dispersion for ink-jet printing ink | 10.0 parts by weight |
| Diethylene glycol | 2.0 parts by weight |
| Ion-exchanged water | 8.0 parts by weight |

The thus obtained ink-jet printing ink had a dispersed particle diameter ($D_{50}$) of 0.03 μm; a dispersion stability (by visual observation) of Rank 5; a percentage of change in dispersed particle diameter ($D_{50}$) of 6.6%; a light resistance (ΔE* value) of 1.0; and an anti-clogging property of Rank 5. As to the hue of the ink-jet printing ink, the L* value thereof was 21.0; the a* value thereof was 9.0; the b* value thereof was −21.5; and the C* value thereof was 23.3.

Example 3
<Production of Aqueous Pigment Dispersion>

78.5 parts by weight of ion-exchanged water and 1.2 parts by weight of a dispersant (mixture of polyacrylic acid and styrene-maleic acid copolymer (mixing ratio: 8:2)) were charged into a sand mill and mixed with each other. Then, 20.0 parts by weight of the colorant obtained in Example 1 and 0.3 part by weight of a defoaming agent (silicone-based defoamer) were added to the mixed solution, and the resultant mixture was mixed and dispersed for one hour and passed through a 0.5 μm-mesh membrane filter, thereby obtaining an aqueous pigment dispersion.

The thus obtained aqueous pigment dispersion had a dispersed particle diameter ($D_{50}$) of 0.02 μm; a dispersion stability (by visual observation) of Rank 5; and a percentage of change in dispersed particle diameter ($D_{50}$) of 6.0%.

Example 4
<Production of Ink-Jet Printing Ink B>

25.0 parts by weight of the aqueous pigment dispersion obtained in Example 3, 64.6 parts by weight of ion-exchanged water, 10.0 parts by weight of diethylene glycol, 0.3 part by weight of a dispersant (mixture of polyacrylic acid and styrene-maleic acid copolymer (mixing ratio: 8:2)) and 0.1 part by weight of a defoaming agent (silicone-based defoamer) were charged into a sand mill, mixed and dispersed for one hour and then passed through a 0.5 μm-mesh membrane filter, thereby obtaining an ink-jet printing ink B.

The thus obtained ink-jet printing ink B had a dispersed particle diameter ($D_{50}$) of 0.02 μm; a dispersion stability (by visual observation) of Rank 5; a percentage of change in dispersed particle diameter ($D_{50}$) of 5.9%; a light resistance (ΔE* value) of 0.9; and an anti-clogging property of Rank 5. As to the hue of the ink-jet printing ink B, the L* value thereof was 21.3; the a* value thereof was 9.2; the b* value thereof was −21.7; and the C* value thereof was 23.6.

Example 5

<Production of Organic and Inorganic Composite Particles>

140 g of methyl hydrogen polysiloxane (tradename: "TSF484", produced by GE TOSHIBA SILICONE CO., LTD.) was added to 7.0 kg of silica particles (particle shape: spherical shape; average particle diameter: 0.005 µm; sphericity: 1.03; BET specific surface area value: 312.6 m$^2$/g; specific gravity: 2.28; L* value: 92.2; a* value: 0.1; b* value: 1.3; C* value: 1.3; hiding power: 6 cm$^2$/g) while operating an edge runner, and the resultant mixture was mixed and stirred for 20 minutes under a linear load of 588 N/cm (60 Kg/cm) at a stirring speed of 22 rpm.

Then, 7.0 kg of organic pigments B (kind: quinacridone-based pigments; particle shape: granular shape; average particle diameter: 0.58 µm; BET specific surface area value: 19.3 m$^2$/g; specific gravity: 1.68; hiding power: 480 cm$^2$/g; light resistance (ΔE* value): 14.7; L* value: 37.0; a* value: 51.9; b* value: 20.6; C* value: 55.8) were added to the above-obtained mixture for 150 minutes while operating the edge runner, and the resultant mixture was mixed and stirred for 90 minutes under a linear load of 441 N/cm (45 Kg/cm) at a stirring speed of 22 rpm, thereby forming the organic pigments B coat onto the methyl hydrogen polysiloxane coating layer formed on the respective silica particles. The obtained particles were dried at 80° C. for 60 minutes using a dryer, thereby obtaining organic and inorganic composite particles.

The thus obtained organic and inorganic composite particles were in the form of granular particles having an average particle diameter of 0.009 µm and a sphericity of 1.04, and had a BET specific surface area value of 242.5 m$^2$/g; and a specific gravity of 1.97. As to the hue of the organic and inorganic composite particles, the L* value thereof was 56.8; the a* value thereof was 48.5; the b* value thereof was 18.8; and the C* value thereof was 52.0. In addition, it was confirmed that the organic and inorganic composite particles had a hiding power of 500 cm$^2$/g; a tinting strength of 172%; a light resistance (ΔE* value) of 1.4; and an organic pigment desorption degree of Rank 5; and a coating amount of methyl hydrogen polysiloxane of 0.53% by weight (calculated as C), and that the amount of the organic pigments B adhered was 38.45% by weight (calculated as C; corresponding to 100 parts by weight based on 100 parts by weight of the silica particles).

As a result of observing the micrograph of the obtained organic and inorganic composite particles, since almost no organic pigments B were recognized from the micrograph, it was confirmed that a substantially whole amount of the organic pigments B used contributed to the formation of the organic pigment coat on the coating layer composed of methyl hydrogen polysiloxane. Further, it was confirmed that the organic pigments B adhered no longer maintained the particle shape and size of those initially added, more specifically, the organic pigments B had a much finer particle size than that of the core particles and were adhered onto the surface of the silica particles in the form of a uniform adhesion coat.

Core Particles 1 to 6:

Core particles 1 to 6 having properties shown in Table 1 were prepared.

Core Particles 7:

A slurry containing silica particles was obtained by dispersing 20 kg of silica particles (core particles 1) in 150 liters of water. The pH value of the thus obtained slurry containing the silica particles was adjusted to 10.5, and then the slurry concentration was adjusted to 98 g/liter by adding water thereto. After 150 liters of the slurry was heated to 60° C., 2,722 ml of a 1.0 mol/liter NaAlO$_2$ solution (corresponding to 0.5% by weight (calculated as Al) based on the weight of the silica particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the silica particles whose surface was coated with hydroxides of aluminum.

Various properties of the obtained silica particles coated with the hydroxides of aluminum are shown in Table 3.

Core Particles 8 to 12:

The same procedure as defined for the production of the above core particles 7, was conducted except that kinds of core particles, and kinds and amounts of additives added in the surface-treating step were changed variously, thereby obtaining surface-treated core particles.

The essential treatment conditions are shown in Table 2, and various properties of the obtained surface-treated core particles are shown in Table 3.

Meanwhile, in Tables, "A" and "S" as described in "kind of coating material used in surface-treating step" represent hydroxides of aluminum and oxides of silicon, respectively.

Organic Pigments A to E:

Organic pigments A to E having properties as shown in Table 4 were prepared.

Examples 6 to 18 and Comparative Examples 1 to 4

The same procedure as defined in Example 1 was conducted except that kinds of core particles, kinds and amounts of gluing agents added in coating step with gluing agent, linear load and treating time for edge runner treatment used in the coating step with gluing agent, kinds and amounts of organic pigments adhered in organic pigment-adhering step, and linear load and treating time for edge runner treatment used in the organic pigment-adhering step, were changed variously, thereby obtaining colorants.

Meanwhile, in Example 10, after 50 parts by weight of the organic pigments B and 70 parts by weight of the organic pigments D were previously mixed together using a Henschel mixer, etc., the obtained mixed pigments were intermittently added five times in an amount of 20.0 parts by weight each to 100 parts by weight of the core particles such that the total amount of the mixed pigments added was 120 parts by weight.

In Example 13, after 40 parts by weight of the organic pigments B and 20 parts by weight of the organic pigments A were previously mixed together using a Henschel mixer, etc., 60 parts by weight of the obtained mixed pigments were continuously added to 100 parts by weight of the core particles for 120 minutes.

The essential production conditions are shown in Tables 5 and 6, and various properties of the obtained colorants are shown in Tables 7 and 8.

Comparative Example 5

Follow-Up Test of Example 1 of Japanese Patent No. 3097208

The silica particles (core particles 1) were dispersed in distilled water at the below-mentioned blending ratio. A silane-based coupling agent (γ-aminopropyl triethoxysilane) was gradually added to the obtained dispersion. After completion of addition of the silane-based coupling agent, the dispersion was allowed to stand at 50° C. for several hours until the reaction between the silica particles and the silane-based coupling agent was completed. Meanwhile, the termination of the reaction between the silica particles and the silane-based coupling agent was determined using FT-IR "MAGNA-IR" (manufactured by Nicolett Co., Ltd.). The resultant dispersion was transferred into an attritor, and the organic pigments A (phthalocyanine-based pigments) were added to the dispersion. The resultant mixture was dispersed for 12 hours to conduct the reaction between the silane-based coupling agent and the organic pigments A.

| Dispersion composition: | |
|---|---|
| Silica particles | 10.0 parts by weight |
| Distilled water | 84.3 parts by weight |
| Silane-based coupling agent | 0.2 part by weight |
| Organic pigments A | 5.0 parts by weight |

Various properties of the thus obtained colored silica particles are shown in Table 8.

Comparative Example 6

Follow-Up Test of Examples of Japanese Patent No. 3105511

9.6 g of the silica particles (core particles 1) were placed in a 500-ml round bottom flask equipped with a magnetic stirrer and a Dean-Stark trap, and dried therein at 100° C. for 24 hours. 300 ml of toluene previously dried by azeotropic distillation under a nitrogen atmosphere, and 2.9 g of a silane-based coupling agent (γ-aminopropyl triethoxysilane) were added to the dried silica particles. The obtained suspension was refluxed at 111° C. for 5 hours, cooled to room temperature, and then centrifuged at a rotating speed of about 10,000 rpm. After removing a supernatant from the suspension, the resultant precipitate was washed with 500 ml of dichloromethane, and successively the mixture of the precipitate and dichloromethane was centrifuged. After a supernatant was removed from the mixture, the obtained residues were dried at 40° C. for 2.5 days in a vacuum dryer (200 mmHg), thereby obtaining 9.6 g of white particles (yield: 76%).

Next, an aqueous mixture prepared by dispersing 1.0 g of the above silica particles containing the silane-based coupling agent and 1.0 g of brilliant blue FCF in 40 ml of water, was placed in a round bottom flask equipped with a magnetic stirrer, stirred therein at room temperature for 18 hours, and then centrifuged. The resultant residues were dispersed in water and then centrifuged until the supernatant became colorless. The obtained residues were re-dispersed in water, and then freeze-dried using a freeze dryer, thereby 0.75 g of colored silica particles.

Various properties of the obtained colored silica particles are shown in Table 8.

Example 19

20 g of sodium docecylbenzenesulfonate (anionic surfactant) was added to 2 kg of the colorant obtained in Example 6, and the resultant mixture was stirred at 30° C. for 30 minutes using a Henschel mixer, thereby obtaining coated colorants.

The essential production conditions are shown in Table 9, and various properties of the obtained coated colorants are shown in Table 10.

Examples 20 to 22

The same procedure as defined in Example 19 was conducted except that kinds of colorants, kinds and amounts of surfactants and/or polymeric dispersing agents, and conditions for edge runner treatment used in the coating step, were changed variously, thereby obtaining colorants coated with the surfactants and/or polymeric dispersing agents.

The essential production conditions are shown in Table 9, and various properties of the obtained coated colorants are shown in Table 10.

Examples 23 to 40 and Comparative Examples 7 to 16

The same procedure as defined in Example 2<Production of ink-jet printing ink A> was conducted except that kinds of colorants were changed variously, thereby obtaining ink-jet printing inks.

The essential production conditions are shown in Tables 11 and 12, and various properties of the obtained ink-jet printing inks are shown in Tables 13 to 14.

Examples 41 to 46 and Comparative Examples 17 to 23

The same procedure as defined in Example 3 was conducted except that kinds of colorants were changed variously, thereby obtaining aqueous pigment dispersions.

The essential production conditions and various properties of the obtained aqueous pigment dispersions are shown in Table 15.

Examples 47 to 52 and Comparative Examples 24 to 30

The same procedure as defined in Example 4<Production of ink-jet printing ink B>was conducted except that kinds of aqueous pigment dispersions were changed variously, thereby obtaining ink-jet printing inks.

The essential production conditions and various properties of the obtained ink-jet printing inks are shown in Table 16.

TABLE 1

| | Properties of core particles | | |
|---|---|---|---|
| Kind of core particles | Kind | Shape | Average particle diameter (μm) |
| Core particles 1 | Silica | Spherical | 0.021 |
| Core particles 2 | Silica | Granular | 0.013 |
| Core particles 3 | Silica | Spherical | 0.005 |
| Core particles 4 | Alumina | Granular | 0.098 |
| Core particles 5 | Precipitated barium sulfate | Granular | 0.059 |
| Core particles 6 | Titanium oxide | Granular | 0.008 |

TABLE 1-continued

| | Properties of core particles | | |
|---|---|---|---|
| Kind of core particles | Sphericity (—) | BET specific surface area value (m$^2$/g) | Specific gravity (—) |
| Core particles 1 | 1.02 | 196.2 | 2.19 |
| Core particles 2 | 1.28 | 256.3 | 2.43 |
| Core particles 3 | 1.03 | 312.6 | 2.28 |
| Core particles 4 | 1.31 | 41.3 | 3.65 |
| Core particles 5 | 1.22 | 21.3 | 4.15 |
| Core particles 6 | 1.04 | 92.2 | 4.17 |

| | Properties of core particles | | | | |
|---|---|---|---|---|---|
| | Hue | | | | |
| Kind of core particles | L* value (—) | a* value (—) | b* value (—) | C* value (—) | Hiding power (cm$^2$/g) |
| Core particles 1 | 93.1 | 0.1 | 0.3 | 0.3 | 6 |
| Core particles 2 | 94.0 | 0.3 | −0.1 | 0.3 | 11 |
| Core particles 3 | 92.2 | 0.1 | 1.3 | 1.3 | 6 |
| Core particles 4 | 96.3 | 0.1 | 0.2 | 0.2 | 18 |
| Core particles 5 | 91.6 | 0.3 | 1.1 | 1.1 | 13 |
| Core particles 6 | 94.4 | 0.3 | 1.3 | 1.3 | 320 |

TABLE 2

| | | Surface-treating step Additives | | |
|---|---|---|---|---|
| Core particles | Kind of core particles | Kind | Calculated as | Amount (wt. %) |
| Core particles 7 | Core particles 1 | Sodium aluminate | Al | 0.5 |
| Core particles 8 | Core particles 2 | Aluminum sulfate | Al | 2.0 |
| Core particles 9 | Core particles 3 | Aluminum sulfate | Al | 2.0 |
| Core particles 10 | Core particles 4 | Water glass #3 | SiO$_2$ | 0.5 |
| Core particles 11 | Core particles 5 | Sodium aluminate | Al | 2.0 |
| | | Water glass #3 | SiO$_2$ | 0.5 |
| Core particles 12 | Core particles 6 | Water glass #3 | SiO$_2$ | 1.0 |

| | Surface-treating step Coating material | | |
|---|---|---|---|
| Core particles | Kind | Calculated as | Amount (wt. %) |
| Core particles 7 | A | Al | 0.49 |
| Core particles 8 | A | Al | 1.96 |
| Core particles 9 | A | Al | 1.96 |
| Core particles 10 | S | SiO$_2$ | 0.48 |
| Core particles 11 | A | Al | 1.93 |
| | S | SiO$_2$ | 0.47 |
| Core particles 12 | S | SiO$_2$ | 0.98 |

TABLE 3

| | Properties of surface-treated core particles | | | |
|---|---|---|---|---|
| Kind of core particles | Average particle diameter (μm) | Sphericity (—) | BET specific surface area value (m$^2$/g) | Specific gravity (—) |
| Core particles 7 | 0.022 | 1.02 | 186.3 | 2.20 |
| Core particles 8 | 0.015 | 1.28 | 211.4 | 2.45 |
| Core particles 9 | 0.005 | 1.03 | 296.4 | 2.31 |
| Core particles 10 | 0.099 | 1.31 | 40.8 | 3.60 |
| Core particles 11 | 0.061 | 1.22 | 21.9 | 4.13 |
| Core particles 12 | 0.008 | 1.04 | 61.2 | 4.15 |

| | Properties of surface-treated core particles | | | | |
|---|---|---|---|---|---|
| | Hue | | | | |
| Kind of core particles | L* value (—) | a* value (—) | b* value (—) | C* value (—) | Hiding power (cm$^2$/g) |
| Core particles 7 | 93.1 | 0.1 | 0.1 | 0.1 | 6 |
| Core particles 8 | 94.1 | 0.2 | 0.1 | 0.2 | 10 |
| Core particles 9 | 92.0 | 0.1 | 1.4 | 1.4 | 6 |
| Core particles 10 | 93.8 | 0.1 | 0.3 | 0.3 | 21 |
| Core particles 11 | 91.0 | 0.4 | 0.8 | 0.9 | 14 |
| Core particles 12 | 94.1 | 0.6 | 1.5 | 1.6 | 310 |

TABLE 4

| | Properties of organic pigments | | |
|---|---|---|---|
| Organic pigments | Kind | Shape | Average particle diameter (μm) |
| Organic pigments A | Pigment Blue (phthalocyanine-based pigment) | Granular | 0.06 |
| Organic pigments B | Pigment Red (quinacridone-based pigment) | Granular | 0.58 |
| Organic pigments C | Pigment Red (azo-based pigment) | Granular | 0.55 |

TABLE 4-continued

| Organic pigments | | | |
|---|---|---|---|
| Organic pigments D | Pigment Yellow (azo-based pigment) | Granular | 0.74 |
| Organic pigments E | Pigment Green (phthalocyanine-based pigment) | Granular | 0.06 |

| | Properties of organic pigments | | | |
|---|---|---|---|---|
| Organic pigments | BET specific surface area value (m²/g) | Specific gravity (—) | Hiding power (cm²/g) | Light resistance (ΔE* value) (—) |
| Organic pigments A | 71.6 | 1.65 | 630 | 10.8 |
| Organic pigments B | 19.3 | 1.68 | 480 | 14.7 |
| Organic pigments C | 18.6 | 1.48 | 380 | 18.6 |
| Organic pigments D | 11.2 | 1.85 | 320 | 16.3 |
| Organic pigments E | 60.5 | 2.29 | 210 | 9.63 |

| | Properties of organic pigments Hue | | | |
|---|---|---|---|---|
| Organic pigments | L* value (—) | a* value (—) | b* value (—) | C* value (—) |
| Organic pigments A | 17.7 | 9.7 | −23.4 | 25.4 |
| Organic pigments B | 37.0 | 51.9 | 20.6 | 55.8 |
| Organic pigments C | 39.3 | 49.2 | 19.8 | 53.0 |
| Organic pigments D | 65.4 | −6.9 | 59.4 | 59.8 |
| Organic pigments E | 21.8 | −18.3 | −7.4 | 19.7 |

TABLE 5

| | | Production of colorant Coating step with gluing agent Additives | |
|---|---|---|---|
| Examples | Kind of core particles | Kind | Amount added (wt. part) |
| Example 6 | Core particles 1 | Methyl triethoxysilane | 2.0 |
| Example 7 | Core particles 2 | Methyl hydrogen polysiloxane | 3.0 |
| Example 8 | Core particles 4 | Isopropyl triisostearoyl titanate | 3.0 |
| Example 9 | Core particles 5 | Water-soluble acrylic resin | 2.0 |
| Example 10 | Core particles 6 | Dimethyl dimethoxysilane | 1.5 |
| Example 11 | Core particles 7 | γ-aminopropyl triethoxysilane | 5.0 |
| Example 12 | Core particles 8 | Methyl hydrogen polysiloxane | 4.0 |
| Example 13 | Core particles 9 | Polyvinyl alcohol | 1.0 |
| Example 14 | Core particles 10 | Phenyl triethoxysilane | 6.0 |
| Example 15 | Core particles 11 | Methyl trimethoxysilane | 8.0 |
| Example 16 | Core particles 12 | Polyvinyl alcohol | 2.0 |
| Example 17 | Core particles A | Methyl hydrogen polysiloxane | 4.0 |
| Example 18 | Core particles A | Methyl hydrogen polysiloxane | 4.0 |

| | Production of colorant Coating step with gluing agent | | | |
|---|---|---|---|---|
| | Edge runner treatment | | | Coating amount (calculated as C) (wt. %) |
| | Linear load | | Time | |
| Examples | (N/cm) | (Kg/cm) | (min) | |
| Example 6 | 588 | 60 | 30 | 0.13 |
| Example 7 | 588 | 60 | 20 | 0.79 |
| Example 8 | 441 | 45 | 30 | 2.17 |
| Example 9 | 588 | 60 | 20 | 0.99 |
| Example 10 | 294 | 30 | 30 | 0.30 |
| Example 11 | 735 | 75 | 30 | 0.80 |
| Example 12 | 294 | 30 | 30 | 1.05 |
| Example 13 | 588 | 60 | 30 | 0.54 |
| Example 14 | 588 | 60 | 20 | 2.03 |
| Example 15 | 441 | 45 | 20 | 0.61 |
| Example 16 | 294 | 30 | 30 | 1.05 |
| Example 17 | 588 | 60 | 30 | 1.06 |
| Example 18 | 588 | 60 | 30 | 1.08 |

| | Production of colorant Adhesion step with organic pigments Organic pigments | | | |
|---|---|---|---|---|
| Examples | Kind | Amount added (wt. part) | Kind | Amount added (wt. part) |
| Example 6 | A | 50.0 | — | — |
| Example 7 | B | 100.0 | — | — |
| Example 8 | C | 100.0 | — | — |
| Example 9 | D | 100.0 | — | — |
| Example 10 | B | 50.0 | D | 70.0 |
| Example 11 | A | 100.0 | — | — |
| Example 12 | B | 150.0 | — | — |
| Example 13 | B | 40.0 | A | 20.0 |
| Example 14 | C | 30.0 | — | — |
| Example 15 | D | 50.0 | — | — |
| Example 16 | E | 70.0 | — | — |
| Example 17 | B | 100.0 | — | — |
| Example 18 | D | 100.0 | — | — |

| | Production of colorant Adhesion step with organic pigments | | | |
|---|---|---|---|---|
| | Edge runner treatment | | | Amount adhered (calculated as C) (wt. %) |
| | Linear load | | Time | |
| Examples | (N/cm) | (Kg/cm) | (min) | |
| Example 6 | 588 | 60 | 60 | 22.14 |
| Example 7 | 588 | 60 | 90 | 38.36 |
| Example 8 | 588 | 60 | 60 | 29.08 |
| Example 9 | 588 | 60 | 90 | 28.25 |
| Example 10 | 392 | 40 | 75 | 30.66 |
| Example 11 | 735 | 75 | 90 | 33.19 |
| Example 12 | 588 | 60 | 120 | 46.03 |
| Example 13 | 588 | 60 | 60 | 27.37 |
| Example 14 | 588 | 60 | 30 | 13.37 |
| Example 15 | 441 | 45 | 60 | 18.81 |
| Example 16 | 588 | 60 | 60 | 14.88 |
| Example 17 | 588 | 60 | 120 | 38.42 |
| Example 18 | 588 | 60 | 120 | 28.21 |

TABLE 6

Production of colorant
Coating step with gluing agent
Additives

| Comparative Examples | Kind of core particles | Kind | Amount added (wt. part) |
|---|---|---|---|
| Comparative Example 1 | Core particles 1 | — | — |
| Comparative Example 2 | Core particles 1 | Methyl triethoxysilane | 0.005 |
| Comparative Example 3 | Core particles 1 | Methyl triethoxysilane | 1.0 |
| Comparative Example 4 | Core particles 1 | Methyl triethoxysilane | 1.0 |

Production of colorant
Coating step with gluing agent

| | Edge runner treatment | | Coating amount (calculated as C) |
|---|---|---|---|
| Comparative Examples | Linear load (N/cm) | Time (min) | (wt. %) |
| | (Kg/cm) | | |
| Comparative Example 1 | — | — | — |
| Comparative Example 2 | 588 / 60 | 30 | — |
| Comparative Example 3 | 588 / 60 | 30 | 0.06 |
| Comparative Example 4 | 588 / 60 | 30 | 0.06 |

Production of colorant
Adhesion step with organic pigments
Organic pigments

| Comparative Examples | Kind | Amount added (wt. part) | Kind | Amount added (wt. part) |
|---|---|---|---|---|
| Comparative Example 1 | A | 50.0 | — | — |
| Comparative Example 2 | A | 50.0 | — | — |
| Comparative Example 3 | A | 750.0 | — | — |
| Comparative Example 4 | A | 0.5 | — | — |

Production of colorant
Adhestion step with organic pigments

| | Edge runner treatment | | Amount adhered (calculated as C) |
|---|---|---|---|
| Comparative Examples | Linear load (N/cm) (Kg/cm) | Time (min) | (wt. %) |
| Comparative Example 1 | 588 / 60 | 30 | 22.04 |
| Comparative Example 2 | 588 / 60 | 30 | 22.09 |
| Comparative Example 3 | 588 / 60 | 30 | 58.53 |
| Comparative Example 4 | 588 / 60 | 30 | 0.30 |

TABLE 7

Properties of colorant

| Examples | Average particle diameter (μm) | Sphericity (—) | BET specific surface area value (m²/g) | Specific gravity (—) |
|---|---|---|---|---|
| Example 6 | 0.023 | 1.02 | 121.2 | 2.00 |
| Example 7 | 0.018 | 1.23 | 165.8 | 2.04 |
| Example 8 | 0.099 | 1.32 | 38.6 | 2.54 |
| Example 9 | 0.061 | 1.22 | 21.0 | 2.98 |
| Example 10 | 0.011 | 1.05 | 54.9 | 2.85 |
| Example 11 | 0.026 | 1.02 | 115.4 | 1.90 |
| Example 12 | 0.023 | 1.28 | 151.2 | 1.97 |
| Example 13 | 0.008 | 1.04 | 241.2 | 2.12 |
| Example 14 | 0.100 | 1.31 | 40.1 | 3.02 |
| Example 15 | 0.062 | 1.22 | 20.4 | 3.25 |
| Example 16 | 0.010 | 1.05 | 58.3 | 3.36 |
| Example 17 | 0.026 | 1.07 | 120.9 | 1.99 |
| Example 18 | 0.026 | 1.06 | 117.6 | 2.06 |

Properties of colorant
Hue

| Examples | L* value (—) | a* value (—) | b* value (—) | C* value (—) |
|---|---|---|---|---|
| Example 6 | 21.3 | 8.6 | −21.3 | 23.0 |
| Example 7 | 44.2 | 50.8 | 19.8 | 54.5 |
| Example 8 | 48.3 | 48.6 | 18.5 | 52.0 |
| Example 9 | 71.3 | −5.0 | 54.6 | 54.8 |
| Example 10 | 56.6 | 28.9 | 40.9 | 50.1 |
| Example 11 | 20.6 | 8.8 | −21.8 | 23.5 |
| Example 12 | 41.6 | 50.3 | 19.3 | 53.9 |
| Example 13 | 53.3 | 38.8 | −4.2 | 39.1 |
| Example 14 | 46.6 | 48.0 | 18.0 | 51.3 |
| Example 15 | 68.3 | −5.6 | 56.6 | 56.9 |
| Example 16 | 25.7 | −18.5 | −7.7 | 20.0 |
| Example 17 | 43.9 | 50.8 | 19.5 | 54.4 |
| Example 18 | 71.0 | −6.1 | 55.3 | 55.6 |

Properties of colorant

| Examples | Hiding power (cm²/g) | Tinting strength (%) |
|---|---|---|
| Example 6 | 520 | 138 |
| Example 7 | 420 | 165 |
| Example 8 | 320 | 136 |
| Example 9 | 220 | 143 |
| Example 10 | 490 | 205 |
| Example 11 | 560 | 164 |
| Example 12 | 440 | 183 |
| Example 13 | 480 | 163 |
| Example 14 | 260 | 118 |
| Example 15 | 180 | 125 |
| Example 16 | 200 | 142 |
| Example 17 | 540 | 157 |
| Example 18 | 520 | 155 |

Properties of colorant

| Examples | Light resistance (ΔE* value) (—) | Degree of desorption of organic pigments |
|---|---|---|
| Example 6 | 1.2 | 5 |
| Example 7 | 1.4 | 5 |
| Example 8 | 1.9 | 4 |
| Example 9 | 2.0 | 4 |
| Example 10 | 2.1 | 5 |
| Example 11 | 1.0 | 5 |
| Example 12 | 1.3 | 5 |
| Example 13 | 1.3 | 5 |
| Example 14 | 1.6 | 5 |
| Example 15 | 1.6 | 5 |
| Example 16 | 1.1 | 5 |

TABLE 7-continued

| Example 17 | 1.7 | 5 |
|---|---|---|
| Example 18 | 1.9 | 5 |

TABLE 8

Properties of colorant

| Comparative Examples | Average particle diameter (μm) | Sphericity (—) | BET specific surface area value (m²/g) | Specific gravity (—) |
|---|---|---|---|---|
| Comparative Example 1 | 0.021 | 1.02 | 153.2 | 2.01 |
| Comparative Example 2 | 0.021 | 1.02 | 148.3 | 2.01 |
| Comparative Example 3 | 0.033 | 1.05 | 81.6 | 1.71 |
| Comparative Example 4 | 0.021 | 1.02 | 188.3 | 2.18 |
| Comparative Example 5 | 0.021 | 1.02 | 179.5 | 2.01 |
| Comparative Example 6 | 0.021 | 1.02 | 182.7 | 2.13 |

Properties of colorant — Hue

| Comparative Examples | L* value (—) | a* value (—) | b* value (—) | C* value (—) |
|---|---|---|---|---|
| Comparative Example 1 | 24.6 | 6.3 | −15.6 | 16.8 |
| Comparative Example 2 | 23.9 | 5.8 | −17.8 | 18.7 |
| Comparative Example 3 | 18.1 | 9.5 | −23.0 | 24.9 |
| Comparative Example 4 | 48.2 | 3.1 | −6.3 | 7.0 |
| Comparative Example 5 | 22.5 | 6.5 | −15.0 | 16.3 |
| Comparative Example 6 | 26.4 | 5.8 | −18.9 | 19.8 |

Properties of colorant

| Comparative Examples | Hiding power (cm²g) | Tinting strength (%) |
|---|---|---|
| Comparative Example 1 | 480 | 110 |
| Comparative Example 2 | 450 | 113 |
| Comparative Example 3 | 620 | 208 |
| Comparative Example 4 | 120 | 101 |
| Comparative Example 5 | 540 | 109 |
| Comparative Example 6 | 480 | 96 |

Properties of colorant

| Comparative Examples | Light resistance (ΔE* value) (—) | Degree of desorption of organic pigment |
|---|---|---|
| Comparative Example 1 | 8.1 | 1 |
| Comparative Example 2 | 7.6 | 2 |
| Comparative Example 3 | 6.7 | 2 |

TABLE 8-continued

| Comparative Example 4 | 1.5 | — |
| Comparative Example 5 | 7.7 | 1 |
| Comparative Example 6 | 12.5 | — |

TABLE 9

Production of surface-coated colorant
Coating step with surfactant and/or polymeric dispersing agent
Additives

| Examples | Kind of colorant | Kind | Amount (wt. part) |
|---|---|---|---|
| Example 19 | Example 6 | Sodium dodecyl-benzenesulfonate | 1.0 |
| Example 20 | Example 7 | Sodium acrylate | 2.0 |
| Example 21 | Example 11 | Sodium laurylsulfate | 1.0 |
| Example 22 | Example 12 | Nonylphenyl polyethylene glycol ether | 5.0 |

Production of surface-coated colorant
Coating step with surfactant and/or polymeric dispersing agent

| Examples | Treating temperature (° C.) | Treating time (min) | Coating amount (calculated as C) (wt. %) |
|---|---|---|---|
| Example 19 | 30 | 30 | 0.60 |
| Example 20 | 30 | 30 | 0.71 |
| Example 21 | 25 | 20 | 0.48 |
| Example 22 | 25 | 30 | 3.67 |

TABLE 10

Properties of surface-coated colorant

| Examples | Average particle diameter (μm) | Sphericity (—) | BET specific surface area value (m²/g) | Specific gravity (—) |
|---|---|---|---|---|
| Example 19 | 0.023 | 1.02 | 116.3 | 1.99 |
| Example 20 | 0.017 | 1.28 | 156.2 | 2.02 |
| Example 21 | 0.026 | 1.02 | 111.3 | 1.89 |
| Example 22 | 0.022 | 1.29 | 138.2 | 1.92 |

Properties of surface-coated colorant — Hue

| Examples | L* value (—) | a* value (—) | b* value (—) | C* value (—) |
|---|---|---|---|---|
| Example 19 | 21.2 | 8.7 | −21.4 | 23.1 |
| Example 20 | 43.0 | 50.0 | 19.2 | 53.6 |
| Example 21 | 20.4 | 8.9 | −22.1 | 23.8 |
| Example 22 | 41.1 | 49.5 | 19.6 | 53.2 |

TABLE 10-continued

Properties of surface-coated colorant

| Examples | Hiding power (cm²/g) | Tinting strength (%) | Light resistance (ΔE* value) (—) |
|---|---|---|---|
| Example 19 | 530 | 140 | 1.1 |
| Example 20 | 450 | 163 | 1.2 |
| Example 21 | 560 | 161 | 0.9 |
| Example 22 | 450 | 180 | 1.1 |

TABLE 11

Production of ink-jet printing on ink

| | Colorant | | Colliodal silica | |
|---|---|---|---|---|
| Examples | Kind | Amount blended (wt. part) | Kind | Amount blended (wt. part) |
| Example 23 | Example 6 | 5.0 | — | — |
| Example 24 | Example 7 | 5.0 | — | — |
| Example 25 | Organic and inorganic composite particles obtained in Example 5 | 5.0 | — | — |
| Example 26 | Example 8 | 5.0 | — | — |
| Example 27 | Example 9 | 5.0 | — | — |
| Example 28 | Example 10 | 5.0 | — | — |
| Example 29 | Example 11 | 5.0 | — | — |
| Example 30 | Example 12 | 5.0 | — | — |
| Example 31 | Example 13 | 5.0 | — | — |
| Example 32 | Example 14 | 5.0 | — | — |
| Example 33 | Example 15 | 5.0 | — | — |
| Example 34 | Example 16 | 5.0 | — | — |
| Example 35 | Example 17 | 5.0 | — | — |
| Example 36 | Example 18 | 5.0 | — | — |
| Example 37 | Example 19 | 5.0 | — | — |
| Example 38 | Example 20 | 5.0 | — | — |
| Example 39 | Example 21 | 5.0 | — | — |
| Example 40 | Example 22 | 5.0 | — | — |

TABLE 12

Production of ink-jet printing ink

| | Colorant | | Colliodal silica | |
|---|---|---|---|---|
| Comparative Examples | Kind | Amount blended (wt. part) | Kind | Amount blended (wt. part) |
| Comparative Example 7 | Organic pigments A | 4.5 | Core particles 1 | 10.0 |
| Comparative Example 8 | Organic pigments B | 4.5 | Core particles 1 | 10.0 |
| Comparative Example 9 | Organic pigments C | 4.5 | Core particles 7 | 10.0 |
| Comparative Example 10 | Organic pigments D | 4.5 | Core particles 1 | 10.0 |
| Comparative Example 11 | Comparative Example 1 | 5.0 | — | — |
| Comparative Example 12 | Comparative Example 2 | 5.0 | — | — |
| Comparative Example 13 | Comparative Example 3 | 5.0 | — | — |
| Comparative Example 14 | Comparative Example 4 | 5.0 | — | — |
| Comparative Example 15 | Comparative Example 5 | 5.0 | — | — |
| Comparative Example 16 | Comparative Example 6 | 5.0 | — | — |

TABLE 13

Properties of ink-jet printing ink

| | Dispersion stability | | |
|---|---|---|---|
| Examples | Dispersed particle diameter (μm) | Visual observation (—) | Percentage of change in dispersed particle diameter (%) |
| Example 23 | 0.03 | 5 | 6.5 |
| Example 24 | 0.03 | 5 | 6.6 |
| Example 25 | 0.02 | 5 | 6.7 |
| Example 26 | 0.13 | 4 | 8.6 |
| Example 27 | 0.08 | 4 | 9.5 |
| Example 28 | 0.02 | 5 | 6.4 |
| Example 29 | 0.03 | 5 | 5.8 |
| Example 30 | 0.02 | 5 | 6.0 |
| Example 31 | 0.01 | 5 | 6.2 |
| Example 32 | 0.12 | 4 | 8.2 |
| Example 33 | 0.09 | 4 | 8.7 |
| Example 34 | 0.02 | 4 | 9.6 |
| Example 35 | 0.03 | 5 | 6.5 |
| Example 36 | 0.03 | 5 | 6.8 |
| Example 37 | 0.03 | 5 | 4.2 |
| Example 38 | 0.03 | 5 | 4.6 |
| Example 39 | 0.03 | 5 | 4.3 |
| Example 40 | 0.03 | 5 | 3.9 |

Properties of ink-jet printing ink Hue

| Examples | L* value (—) | a* value (—) | b* value (—) | C* value (—) |
|---|---|---|---|---|
| Example 23 | 21.4 | 8.4 | −21.1 | 22.7 |
| Example 24 | 43.3 | 48.6 | 19.0 | 52.2 |
| Example 25 | 57.3 | 48.8 | 19.2 | 52.4 |
| Example 26 | 48.5 | 47.1 | 18.1 | 50.5 |
| Example 27 | 71.3 | −4.6 | 54.4 | 54.6 |
| Example 28 | 57.1 | 28.2 | 40.6 | 49.4 |
| Example 29 | 20.8 | 8.6 | −21.6 | 23.2 |
| Example 30 | 41.9 | 49.0 | 18.9 | 52.5 |
| Example 31 | 54.2 | 38.4 | −4.5 | 38.7 |
| Example 32 | 47.1 | 47.3 | 17.3 | 50.4 |
| Example 33 | 68.6 | −5.3 | 56.0 | 56.3 |
| Example 34 | 26.2 | −18.6 | −7.9 | 20.2 |
| Example 35 | 43.0 | 48.4 | 19.2 | 52.1 |
| Example 36 | 71.5 | −5.7 | 55.0 | 55.3 |
| Example 37 | 21.4 | 8.1 | −21.0 | 22.5 |
| Example 38 | 44.0 | 49.2 | 18.7 | 52.6 |
| Example 39 | 20.6 | 8.2 | −22.1 | 23.6 |
| Example 40 | 40.5 | 48.9 | 19.0 | 52.5 |

TABLE 13-continued

| | Properties of ink-jet printing ink | |
|---|---|---|
| Examples | Light resistance (ΔE* value) (—) | Anti-clogging property (—) |
| Example 23 | 1.1 | 5 |
| Example 24 | 1.4 | 5 |
| Example 25 | 1.4 | 5 |
| Example 26 | 1.9 | 4 |
| Example 27 | 1.5 | 4 |
| Example 28 | 1.9 | 5 |
| Example 29 | 0.8 | 5 |
| Example 30 | 0.9 | 5 |
| Example 31 | 1.2 | 5 |
| Example 32 | 1.4 | 4 |
| Example 33 | 1.5 | 4 |
| Example 34 | 1.0 | 4 |
| Example 35 | 1.2 | 5 |
| Example 36 | 1.8 | 5 |
| Example 37 | 1.1 | 5 |
| Example 38 | 1.2 | 5 |
| Example 39 | 0.7 | 5 |
| Example 40 | 0.9 | 5 |

TABLE 14

| | Properties of ink-jet printing ink | | |
|---|---|---|---|
| | | Dispersion stability | |
| Comparative Examples | Dispersed particle diameter (μm) | Visual observation (—) | Percentage of change in dispersed particle diameter (%) |
| Comparative Example 7 | 0.18 | 1 | 20.6 |
| Comparative Example 8 | 0.63 | 1 | 17.4 |
| Comparative Example 9 | 0.76 | 1 | 24.0 |
| Comparative Example 10 | 0.83 | 1 | 18.5 |
| Comparative Example 11 | 0.23 | 1 | 17.2 |
| Comparative Example 12 | 0.21 | 1 | 16.9 |
| Comparative Example 13 | 0.16 | 2 | 14.3 |
| Comparative Example 14 | 0.06 | 2 | 8.5 |
| Comparative Example 15 | 0.15 | 1 | 14.3 |
| Comparative Example 16 | 0.09 | 3 | 8.4 |

| | Properties of ink-jet printing ink Hue | | | |
|---|---|---|---|---|
| Comparative Examples | L* value (—) | a* value (—) | b* value (—) | C* value (—) |
| Comparative Example 7 | 18.5 | 8.6 | −23.4 | 24.9 |
| Comparative Example 8 | 36.1 | 49.6 | 20.0 | 53.5 |
| Comparative Example 9 | 39.0 | 47.3 | 19.3 | 51.1 |
| Comparative Example 10 | 64.9 | −5.3 | 56.2 | 56.4 |
| Comparative Example 11 | 23.6 | 5.2 | −15.0 | 15.9 |

TABLE 14-continued

| Comparative Example 12 | 23.8 | 4.8 | −17.1 | 17.8 |
| Comparative Example 13 | 18.4 | 9.0 | −22.6 | 24.3 |
| Comparative Example 14 | 50.3 | 2.6 | −5.4 | 6.0 |
| Comparative Example 15 | 23.1 | 5.5 | −14.8 | 15.8 |
| Comparative Example 16 | 26.6 | 5.3 | −18.8 | 19.5 |

| | Properties of ink-jet printing ink | |
|---|---|---|
| Comparatives Examples | Light resistance (ΔE* value) (—) | Anti-clogging property (—) |
| Comparative Example 7 | 6.8 | 2 |
| Comparative Example 8 | 6.9 | 1 |
| Comparative Example 9 | 10.5 | 1 |
| Comparative Example 10 | 10.0 | 1 |
| Comparative Example 11 | 6.7 | 2 |
| Comparative Example 12 | 6.5 | 2 |
| Comparative Example 13 | 6.6 | 2 |
| Comparative Example 14 | 1.8 | 2 |
| Comparative Example 15 | 7.2 | 2 |
| Comparative Example 16 | 19.3 | 3 |

TABLE 15

| | Production of aqueous pigment dispersion | | | |
|---|---|---|---|---|
| | Colorant | | Colloidal silica | |
| Examples and Comparative Examples | Kind | Amount blended (wt. part) | Kind | Amount blended (wt. part) |
| Example 41 | Example 6 | 20.0 | — | — |
| Example 42 | Organic and inorganic composite particles obtained in Example 5 | 20.0 | — | — |
| Example 43 | Example 8 | 20.0 | — | — |
| Example 44 | Example 9 | 20.0 | — | — |
| Example 45 | Example 10 | 20.0 | — | — |
| Example 46 | Example 11 | 20.0 | — | — |
| Comparative Example 17 | Organic pigment A | 10.0 | Core particles 1 | 10.0 |
| Comparative Example 18 | Comparative Example 1 | 20.0 | — | — |
| Comparative Example 19 | Comparative Example 2 | 20.0 | — | — |
| Comparative Example 20 | Comparative Example 3 | 20.0 | — | — |
| Comparative Example 21 | Comparative Example 4 | 20.0 | — | — |
| Comparative Example 22 | Comparative Example 5 | 20.0 | — | — |
| Comparative Example 23 | Comparative Example 6 | 20.0 | — | — |

TABLE 15-continued

| | Properties of aqueous pigment dispersion | | |
|---|---|---|---|
| | | Dispersion stability | |
| Examples and Comparative Examples | Dispersed particle diameter ($\mu$m) | Visual observation (—) | Percentage of change in dispersed particle diameter (%) |
| Example 41 | 0.02 | 5 | 6.1 |
| Example 42 | 0.01 | 5 | 6.3 |
| Example 43 | 0.10 | 5 | 6.9 |
| Example 44 | 0.06 | 5 | 7.0 |
| Example 45 | 0.01 | 5 | 6.0 |
| Example 46 | 0.02 | 5 | 5.6 |
| Comparative Example 17 | 0.18 | 1 | 20.2 |
| Comparative Example 18 | 0.21 | 1 | 17.0 |
| Comparative Example 19 | 0.20 | 1 | 16.6 |
| Comparative Example 20 | 0.15 | 2 | 14.1 |
| Comparative Example 21 | 0.06 | 2 | 8.4 |
| Comparative Example 22 | 0.12 | 1 | 13.9 |
| Comparative Example 23 | 0.09 | 3 | 8.2 |

TABLE 16

| Examples and Comparative Examples | Production of ink-jet printing ink Aqeous pigment dispersion | |
|---|---|---|
| | Kind | Amount blended (wt. part) |
| Example 47 | Example 41 | 25.0 |
| Example 48 | Example 42 | 25.0 |
| Example 49 | Example 43 | 25.0 |
| Example 50 | Example 44 | 25.0 |
| Example 51 | Example 45 | 25.0 |
| Example 52 | Example 46 | 25.0 |
| Comparative Example 24 | Comparative Example 17 | 25.0 |
| Comparative Example 25 | Comparative Example 18 | 25.0 |
| Comparative Example 26 | Comparative Example 19 | 25.0 |
| Comparative Example 27 | Comparative Example 20 | 25.0 |
| Comparative Example 28 | Comparative Example 21 | 25.0 |
| Comparative Example 29 | Comparative Example 22 | 25.0 |
| Comparative Example 30 | Comparative Example 23 | 25.0 |

| | Properties of ink-jet printing ink | | |
|---|---|---|---|
| | | Dispersion stability | |
| Examples and Comparative Examples | Dispersed particle diameter ($\mu$m) | Visual observation (—) | Percentage of change in dispersed particle diameter (%) |
| Example 47 | 0.02 | 5 | 5.9 |
| Example 48 | 0.01 | 5 | 6.2 |
| Example 49 | 0.09 | 5 | 6.6 |
| Example 50 | 0.06 | 5 | 6.9 |
| Example 51 | 0.01 | 5 | 5.8 |
| Example 52 | 0.02 | 5 | 5.4 |
| Comparative Example 24 | 0.17 | 1 | 20.1 |
| Comparative Example 25 | 0.20 | 1 | 16.8 |
| Comparative Example 26 | 0.19 | 1 | 16.5 |
| Comparative Example 27 | 0.14 | 2 | 14.0 |
| Comparative Example 28 | 0.06 | 2 | 8.3 |
| Comparative Example 29 | 0.11 | 1 | 13.6 |
| Comparative Example 30 | 0.08 | 3 | 8.1 |

| | Properties of ink-jet printing ink Hue | | | |
|---|---|---|---|---|
| Examples and Comparative Examples | L* value (—) | a* value (—) | b* value (—) | C* value (—) |
| Example 47 | 21.8 | 8.6 | −21.3 | 23.0 |
| Example 48 | 57.7 | 49.0 | 19.5 | 52.7 |
| Example 49 | 48.8 | 47.2 | 18.3 | 50.6 |
| Example 50 | 71.5 | −4.8 | 54.5 | 54.7 |
| Example 51 | 57.4 | 28.4 | 40.7 | 49.6 |
| Example 52 | 21.1 | 8.7 | −21.9 | 23.6 |
| Comparative Example 24 | 18.8 | 8.5 | −23.3 | 24.8 |
| Comparative Example 25 | 23.8 | 5.3 | −14.9 | 15.8 |
| Comparative Example 26 | 24.0 | 4.8 | −17.3 | 18.0 |
| Comparative Example 27 | 18.5 | 8.9 | −22.8 | 24.5 |
| Comparative Example 28 | 50.5 | 2.7 | −5.5 | 6.1 |
| Comparative Example 29 | 23.2 | 5.7 | −14.6 | 15.7 |
| Comparative Example 30 | 26.9 | 5.5 | −18.5 | 19.3 |

| Examples and Comparative Examples | Properties of ink-jet printing ink | |
|---|---|---|
| | Light resistance ($\Delta$E* value) (—) | Anti-clogging property (—) |
| Example 47 | 1.0 | 5 |
| Example 48 | 1.3 | 5 |
| Example 49 | 1.8 | 5 |
| Example 50 | 1.4 | 5 |
| Example 51 | 1.9 | 5 |
| Example 52 | 0.8 | 5 |
| Comparative Example 24 | 6.7 | 2 |
| Comparative Example 25 | 6.6 | 2 |
| Comparative Example 26 | 6.4 | 2 |
| Comparative Example 27 | 6.4 | 2 |
| Comparative Example 28 | 1.7 | 2 |
| Comparative Example 29 | 7.0 | 2 |
| Comparative Example 30 | 19.1 | 3 |

What is claimed is:

1. A colorant for ink-jet printing ink, having an average particle diameter of 0.001 to 0.15 $\mu$m, comprising:

extender pigments as core particles;

a gluing agent coating layer formed on at least a part of surface of said core particle; and an organic pigment coat uniformly formed on at least a part of said gluing agent coating layer.

2. A colorant according to claim 1, which further has a BET specific surface area value of 15 to 500 m²/g, a specific gravity of 1.3 to 3.5 and a hiding power of less than 1,000 cm²/g.

3. A colorant according to claim 1, wherein said gluing agent is at least one material selected from the group consisting of organosilicon compounds and coupling agents.

4. A colorant according to claim 1, wherein the amount of said organic pigment coat is 1 to 500 parts by weight based on 100 parts by weight of said extender pigments.

5. A colorant according to claim 1, which further comprises an outer coating layer formed on at least a part of said organic pigment coat, comprising at least one material selected from the group consisting of anionic surfactants, nonionic surfactants, cationic surfactants and polymeric dispersing agents.

6. A colorant according to claim 5, wherein the amount of said outer coating layer is 0.1 to 10.0% by weight, calculated as C, based on the weight of the colorant.

7. A colorant according to claim 1, wherein a coating layer comprising at least one compound selected from the group consisting of hydroxides of aluminum, oxides of aluminum, hydroxides of silicon and oxides of silicon, is formed between the surface of said core particle and the gluing agent coating layer.

8. A colorant according to claim 7, wherein the amount of said coating layer comprising at least one compound selected from the group consisting of hydroxides of aluminum, oxides of aluminum, hydroxides of silicon and oxides of silicon, is 0.01 to 20% by weight, calculated as Al, $SiO_2$ or a sum of Al and $SiO_2$, based on the weight of the core particles coated therewith.

9. A colorant for ink-jet printing ink, having an average particle diameter of 0.001 to 0.15 μm, a BET specific surface area value of 15 to 500 m²/g, a specific gravity of 1.3 to 3.5 and a hiding power of less than 1,000 cm²/g, comprising:
    extender pigments as core particles;
    a gluing agent coating layer formed on at least a part of surface of said core particle; and
    an organic pigment coat uniformly formed on at least a part of said gluing agent coating layer in the amount of 1 to 500 parts by weight based on 100 parts by weight of said extender pigments.

10. A colorant for ink-jet printing ink, having an average particle diameter of 0.001 to 0.15 μm, comprising:
    extender pigments as core particles;
    a gluing agent coating layer formed on at least a part of surface of said core particle;
    an organic pigment coat uniformly formed on at least a part of said gluing agent coating layer; and
    an outer coating layer formed on at least a part of said organic pigment coat, comprising at least one material selected from the group consisting of anionic surfactants, nonionic surfactants, cationic surfactants and polymeric dispersing agents.

11. A colorant according to 10, wherein the amount of said outer coating layer is 0.1 to 10.0% by weight, calculated as C, based on the weight of the colorant.

12. A colorant for ink-jet printing ink, having an average particle diameter of 0.001 to 0.15 μm, comprising:
    extender pigments as core particles;
    a coating layer formed on at least a part of surface of said core particle, comprising at least one compound selected from the group consisting of hydroxides of aluminum, oxides of aluminum, hydroxides of silicon and oxides of silicon;
    a gluing agent coating layer formed on at least a part of surface of said coating layer;
    an organic pigment coat uniformly formed on at least a part of said gluing agent coating layer.

13. A colorant for ink-jet printing ink, having an average particle diameter of 0.001 to 0.15 μm, comprising:
    extender pigments as core particles;
    a coating layer formed on at least a part of surface of said core particle, comprising at least one compound selected from the group consisting of hydroxides of aluminum, oxides of aluminum, hydroxides of silicon and oxides of silicon,
    a gluing agent coating layer formed on at least a part of surface of said coating;
    an organic pigment coat uniformly formed on at least a part of said gluing agent coating layer; and
    an outer coating layer formed on at least a part of said organic pigment coat, comprising at least one material selected from the group consisting of anionic surfactants, nonionic surfactants, cationic surfactants and alkali-soluble resins.

14. An ink-jet printing ink comprising the colorant as defined in claim 1 and an ink base solution.

15. An ink-jet printing ink according to claim 14, wherein the amount of said colorant is 1 to 20% by weight based on the weight of the ink base solution.

16. An ink-jet printing ink comprising the colorant as defined in claim 9, and an ink base solution the amount of said colorant being 1 to 20% by weight based on the weight of the in base solution.

17. An aqueous pigment dispersion comprising 10 to 40% by weight of the colorant as defined in claim 1, and a base solution for the aqueous pigment dispersion.

18. An ink-jet printing ink comprising the aqueous pigment dispersion as defined in claim 17, a dispersant and water.

19. Organic and inorganic composite particles, having an average particle diameter of from 0.001 to less than 0.01 μm, comprising:
    white inorganic particles as core particles;
    a gluing agent coating layer formed on at least a part of surface of said white inorganic particles; and
    an organic pigment coat uniformly formed on at least a part of said gluing agent coating layer in an amount of 1 to 500 parts by weight based on 100 parts by weight of the white inorganic particles.

20. Organic and inorganic composite particles according to claim 19, wherein said gluing agent is at least one material selected from the group consisting of organosilicon compounds and coupling agents.

21. Organic and inorganic composite particles according to claim 19, wherein a coating layer comprising at least one compound selected from the group consisting of hydroxides of aluminum, oxides of aluminum, hydroxides of silicon and oxides of silicon, is formed between the surface of said core particle and the gluing agent coating layer.

22. Organic and inorganic composite particles according to claim 21, wherein the amount of said coating layer comprising at least one compound selected from the group consisting of hydroxides of aluminum, oxides of aluminum, hydroxides of silicon and oxides of silicon, is 0.01 to 20% by weight, calculated as Al, $SiO_2$ or a sum of Al and $SiO_2$, based on the weight of the core particles coated therewith.

* * * * *